US011971645B2

(12) United States Patent
Goh et al.

(10) Patent No.: US 11,971,645 B2
(45) Date of Patent: Apr. 30, 2024

(54) CYLINDRICAL CAMERA ROTATING CAP SHUTTER MECHANISM WITH ENHANCED AUDIO SECURITY

(71) Applicant: Dell Products L.P., Round Rock, TX (US)

(72) Inventors: Peng Lip Goh, Singapore (SG); Suet Chan Law, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 17/349,396

(22) Filed: Jun. 16, 2021

(65) Prior Publication Data

US 2022/0404685 A1    Dec. 22, 2022

(51) Int. Cl.
*G03B 9/22* (2021.01)
*G03B 11/04* (2021.01)
*G06V 20/00* (2022.01)
*H04N 23/51* (2023.01)
*H04N 23/55* (2023.01)

(52) U.S. Cl.
CPC .............. *G03B 11/043* (2013.01); *G03B 9/22* (2013.01); *G06V 20/00* (2022.01); *H04N 23/51* (2023.01); *H04N 23/55* (2023.01)

(58) Field of Classification Search
CPC ........ G03B 11/043; G03B 9/22; G06V 20/00; H04N 5/2252; H04N 5/2254
See application file for complete search history.

(56) References Cited

U.S. PATENT DOCUMENTS

| 4,851,870 A | 7/1989 | Tanaka et al. |
| 6,570,621 B2 | 5/2003 | Bigler et al. |
| 7,337,497 B2 | 3/2008 | Seidler et al. |
| 7,612,825 B2 | 11/2009 | Silverbrook |

(Continued)

FOREIGN PATENT DOCUMENTS

| EP | 2128751 A1 | 12/2009 |
| EP | 3137967 B1 | 12/2018 |

(Continued)

OTHER PUBLICATIONS

Wikipedia, "iSight," downloaded from http://en.wikipedia.org/wiki/ISight on May 20, 2021, 4 pages.

*Primary Examiner* — Dramos Kalapodas
*Assistant Examiner* — Berteau Joisil
(74) *Attorney, Agent, or Firm* — ZAGORIN CAVE LLP; Robert W. Holland

(57) ABSTRACT

An information handling system peripheral camera ensures privacy with a cover that minimizes distance of a camera module to a front opening of the camera housing. For instance, opposing cover members rotate about geared ends that engage to translate rotation between the members, where the members meet over a camera opening to block capture of visual images and move to opposing sides to expose the camera module. In an alternative embodiment, a rotating shutter arrangement selectively covers the camera for security and also covers a microphone to provide security against unauthorized audible access through the camera. Selective covering and exposing of a camera module, infrared camera, microphone and user presence detection sensor support adaptive security at a camera based upon end user context.

20 Claims, 19 Drawing Sheets

(56) References Cited

U.S. PATENT DOCUMENTS

| | | |
|---|---|---|
| D618,266 S | 6/2010 | Imaeda |
| 8,571,398 B1 | 10/2013 | Goddard et al. |
| 8,824,166 B2 | 9/2014 | Rohrbach |
| 9,189,697 B1 | 11/2015 | Daniel |
| 9,353,965 B1 | 5/2016 | Goyal et al. |
| D761,340 S | 7/2016 | Pacurariu et al. |
| D761,343 S | 7/2016 | Schmidt et al. |
| 9,467,605 B2 | 10/2016 | Johnson et al. |
| 9,886,598 B2 | 2/2018 | Ziaja et al. |
| 10,402,624 B2 | 9/2019 | Valko et al. |
| 10,694,145 B1 | 6/2020 | Skinner et al. |
| 2007/0046031 A1 | 3/2007 | Goldenberg et al. |
| 2007/0274709 A1* | 11/2007 | Ho .................. G03B 17/00 396/448 |
| 2009/0101768 A1 | 4/2009 | Wert |
| 2010/0134635 A1 | 6/2010 | Teppan et al. |
| 2011/0206363 A1* | 8/2011 | Han .................. G03B 9/14 396/463 |
| 2013/0163197 A1 | 6/2013 | Mack et al. |
| 2013/0221240 A1 | 8/2013 | Kishima et al. |
| 2013/0286226 A1 | 10/2013 | Baum et al. |
| 2016/0238350 A1 | 8/2016 | Tseng |
| 2017/0315596 A1 | 11/2017 | Torres et al. |
| 2018/0288592 A1 | 10/2018 | Kim et al. |
| 2018/0300510 A1 | 10/2018 | Lam et al. |
| 2020/0173633 A1 | 6/2020 | Bai et al. |
| 2021/0266734 A1 | 8/2021 | Kapinos et al. |
| 2022/0171889 A1 | 6/2022 | Ke et al. |
| 2022/0245288 A1 | 8/2022 | Anderson et al. |

FOREIGN PATENT DOCUMENTS

| | | | |
|---|---|---|---|
| EP | 3789979 A2 | 3/2021 | |
| EP | 3846142 A1 * | 7/2021 | ....... G08B 13/19619 |
| JP | 2004138980 A * | 5/2004 | ............. G03B 17/04 |
| WO | 2011087301 A1 | 7/2011 | |
| WO | 2016153512 | 9/2016 | |

* cited by examiner

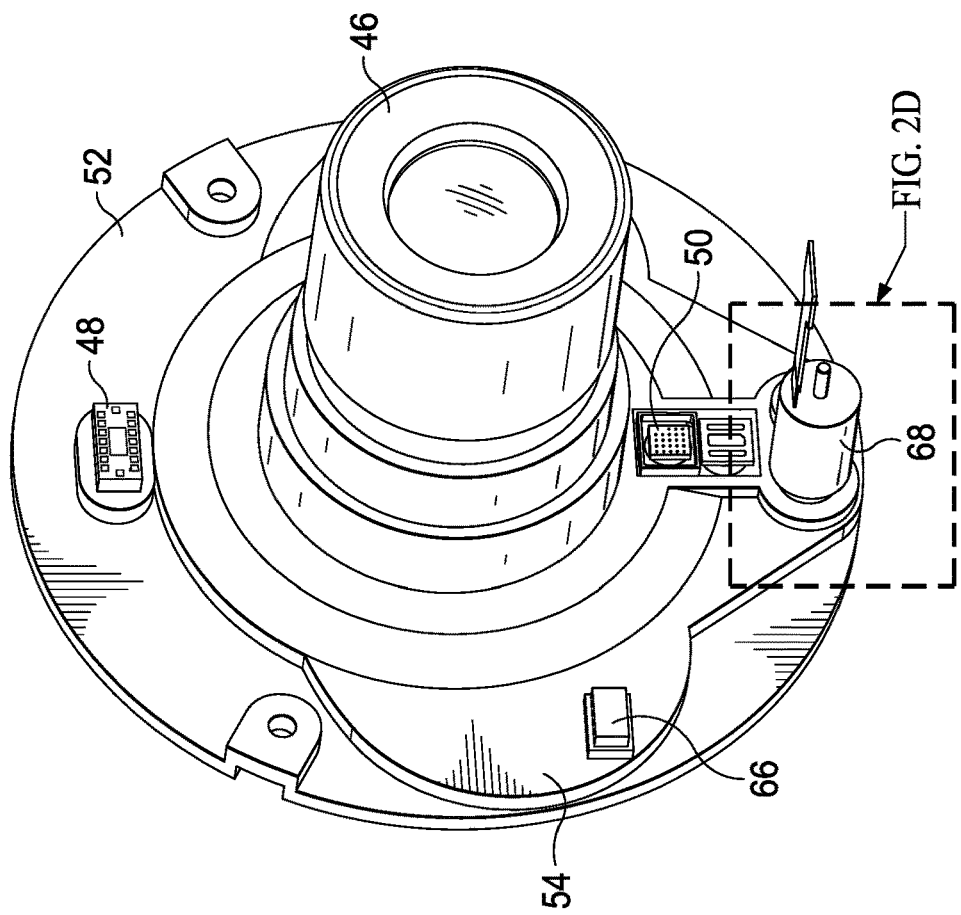
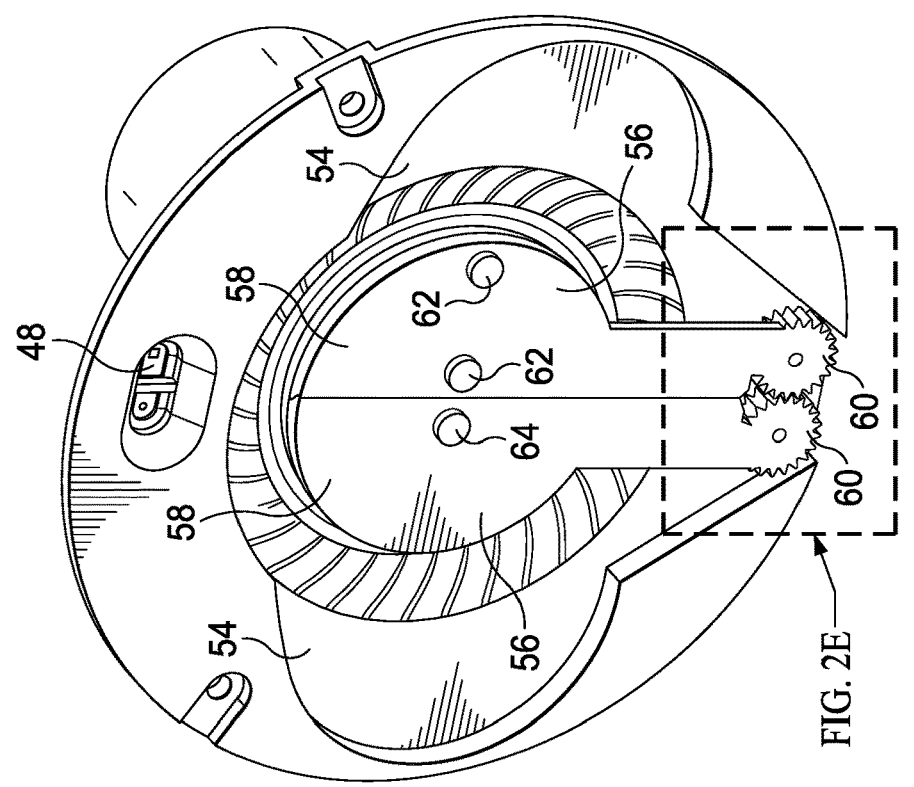

CYLINDRICAL CAMERA ROTATING CAP SHUTTER MECHANISM WITH ENHANCED AUDIO SECURITY

CROSS REFERENCE TO RELATED APPLICATIONS

U.S. patent application Ser. No. 17/349,407, filed Jun. 16, 2021, entitled "Cylindrical Camera Dual Leaf Shutter" by inventors Peng Lip Goh, Celia Law, and Deeder M. Aurongzeb, describes exemplary methods and systems and is incorporated by reference in its entirety.

U.S. patent application Ser. No. 17/349,402, filed Jun. 16, 2021, entitled "Peripheral Camera and Information Handling System Security System and Method" by inventors Peng Lip Goh, Celia Law and Deeder M. Aurongzeb, describes exemplary methods and systems and is incorporated by reference in its entirety.

BACKGROUND OF THE INVENTION

Field of the Invention

The present invention relates in general to the information handling system cameras, and more particularly to an information handling system cylindrical camera rotating cap shutter mechanism with enhanced audio security.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with peripheral devices, such as keyboards, mice and cameras. Cameras are typically used to support videoconferences in which visual images captured by cameras are exchanged so that end users can communicate while viewing each other. Typically, videoconferences are performed with cameras that have relatively low resolution. The use of low resolution is driven in part by the amount of bandwidth consumed by communication of video information. In addition, low resolution is driven by the footprint of typical Web cameras, which generally do not have the size to support high quality lenses. For example, cameras integrated in portable information handling systems tend to have a restricted focal length due to the thickness of typical portable information handling system housings. Peripheral Web cameras typically have a larger footprint so that higher quality lenses may be included that capture higher resolution visual images than integrated cameras. Generally, even with larger housing footprints, Web cameras tend to limit resolution to High Definition visual images as Ultra High Definition or 4K cameras and have large bandwidth demands.

Recently, enterprises have experienced an increased reliance on videoconferences to interact internally between employees and externally with customers and vendors. Although lower-resolution Web cameras are sufficient for many daily uses, in many situations, higher quality video images are desired. For instance, in conferences that involve senior executives or high government officials, higher resolution video images are generally desired. Often, such high level conferences are done from large conference rooms and involve a number of participants. Generally, high resolution cameras with high quality lenses offer a number of advantages in such scenarios. One advantage is that greater focal length will allow one camera to provide high quality video images at different ranges through zoom functionality. Another advantage is that higher resolution offers greater flexibility for digital zoom, pan and tilt functions, such as by cropping an image to capture a participant with a close-up view. When a camera provides higher resolution visual images, a number of additional integrated functions may be provided at the camera, such as artificial intelligence analysis that aids with facial recognition and gesture inputs. For example, processing resources added to the camera monitor visual information for desired attributes that are reported to the information handling system, such as an end user's identity.

One difficulty with including higher resolution capability in a peripheral Web camera is that additional interior room generally needed for higher resolution and greater integrated intelligence can result in awkward form factors with unsatisfactory aesthetics, particularly when used in profile video conferences. Assembly of the camera to include high resolution lenses and additional processing components can result in a complex internal arrangement that does not readily fit into smaller form factors. For instance, an external housing of the camera tends to include screws and other assembly mechanisms that are visible to the end user. Assembly of a camera in a housing can affect how the lens captures visual images and the size of the housing. For example, to achieve a desired field of view for a lens, the size of the housing generally must increase as the lens distance to a front glass of the housing increases. However, compressing a lens up close to a housing front glass can be difficult where the camera includes a front shutter as the front shutter mechanism tends to consume areas at the front face of the housing. The greater the size of the front shutter, the larger dimension needed for the camera housing to get the desired field of view.

Another difficulty that can arise with peripheral camera is that a front shutter that offers enhanced security is not controlled in a coordinated manner with an information handling system's operation. For example, cameras integrated in information handling system housings often include manual shutters that an end user may slide over the camera lens to prevent unauthorized access to the camera. In some systems, an automated shutter may be used so that the camera lens is blocked when the camera is not in use and opened when an end user initiates a camera function. Peripheral cameras typically interface through a cable, such as a USB cable, so that camera security more typically amounts to an end user unplugging the camera when not in use. Other functions associated with a peripheral camera may include a microphone to capture audio and an infrared camera to provide depth information. If a peripheral camera remains connected to an information handling system and powered up without covering the camera at the front, an unauthorized user may be able to obtain access to visual information and also depth and audio information.

SUMMARY OF THE INVENTION

Therefore, a need has arisen for a system and method which integrates a lens cover in a peripheral camera with minimal impact on camera housing dimensions.

A further need exists for a system and method that manages peripheral camera and information handling system security.

In accordance with the present invention, a system and method are provided which substantially reduce the disadvantages and problems associated with previous methods and systems for assembly of a peripheral camera in a housing and interactions of a peripheral camera with an information handling system. A shutter integrates in a front face of a peripheral camera to selectively block visual images captured by the camera, such as with dual leaf cover members that rotate over the camera or shutter members that extend and retract with rotation of a cap coupled to the camera front face. Security may be enhanced with selective mechanical blocking of camera functions, such as depth images, user presence detection and audio capture, which are coordinated with an information handling system interfaced with the display for a peripheral display viewing position.

More specifically, an information handling system having a processor and memory interfaces with a peripheral camera that captures visual images to support video conferences. The peripheral camera is assembled into a cylindrical housing having a shutter at the front face to mechanically block a camera module from capturing visual images. In one embodiment, the shutter has opposing dual leaf cover members that rotate over the camera module to block capture of visual images and to opposing sides of the camera module to allow capture of visual images. Cover member rotation is coordinated with gears that engage at the rotation point and interface with an actuator, such as a step motor or a piezoelectric element. In an alternative embodiment, shutter members extend and retract over the camera module by interaction of a rotationally coupled cap of the camera and a static shutter plate disposed around the camera module that includes guides to define shutter member movement. In various embodiments, different camera function availability is managed based upon shutter position, such as by selectively covering and uncovering an infrared camera, a microphone and a user presence detection sensor based upon alignment of openings in the cap and the functional components disposed in the camera housing. A security module executing on a processing resource with the peripheral camera monitors context, such as with user presence and infrared images, to manage security of the peripheral camera as well as visual images presented at a peripheral display interfaced with an information handling system of the peripheral camera.

The present invention provides a number of important technical advantages. One example of an important technical advantage is that a peripheral camera integrates in a cylindrical housing a shutter that efficiently uses space to minimize the distance between a camera module disposed in the cylindrical housing and a front glass disposed over the cylindrical housing front face. Proximity of the camera module to the front glass provides an increased field of view for the camera module within a smaller diameter cylindrical housing. The camera module is mechanically blocked from capture of visual images to provide enhance security for an end user of the peripheral camera. In addition, an infrared camera and microphone may be selectively blocked to prevent unauthorized access, such as by a remote hacker. In one embodiment, a security module executing on a processing resource within the peripheral camera manages selective exposure of camera functions to prevent unauthorized camera access as well as to provide enhanced security for an information handling system interfaced with the peripheral camera. For instance, the peripheral camera monitors a peripheral display visual presentation zone to manage security of presented visual images by commanding adjustments to presented visual images based upon sensed context at the peripheral display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A, 2B, 2C, 2D and 2E depict a dual leaf camera security system for selectively blocking and providing access to a camera module disposed in a camera housing;

DETAILED DESCRIPTION

An information handling system peripheral camera secures against unauthorized access of camera resources by selectively covering camera and microphone resources and by monitoring end user interactions at an associated peripheral display to detect unauthorized access to visual information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
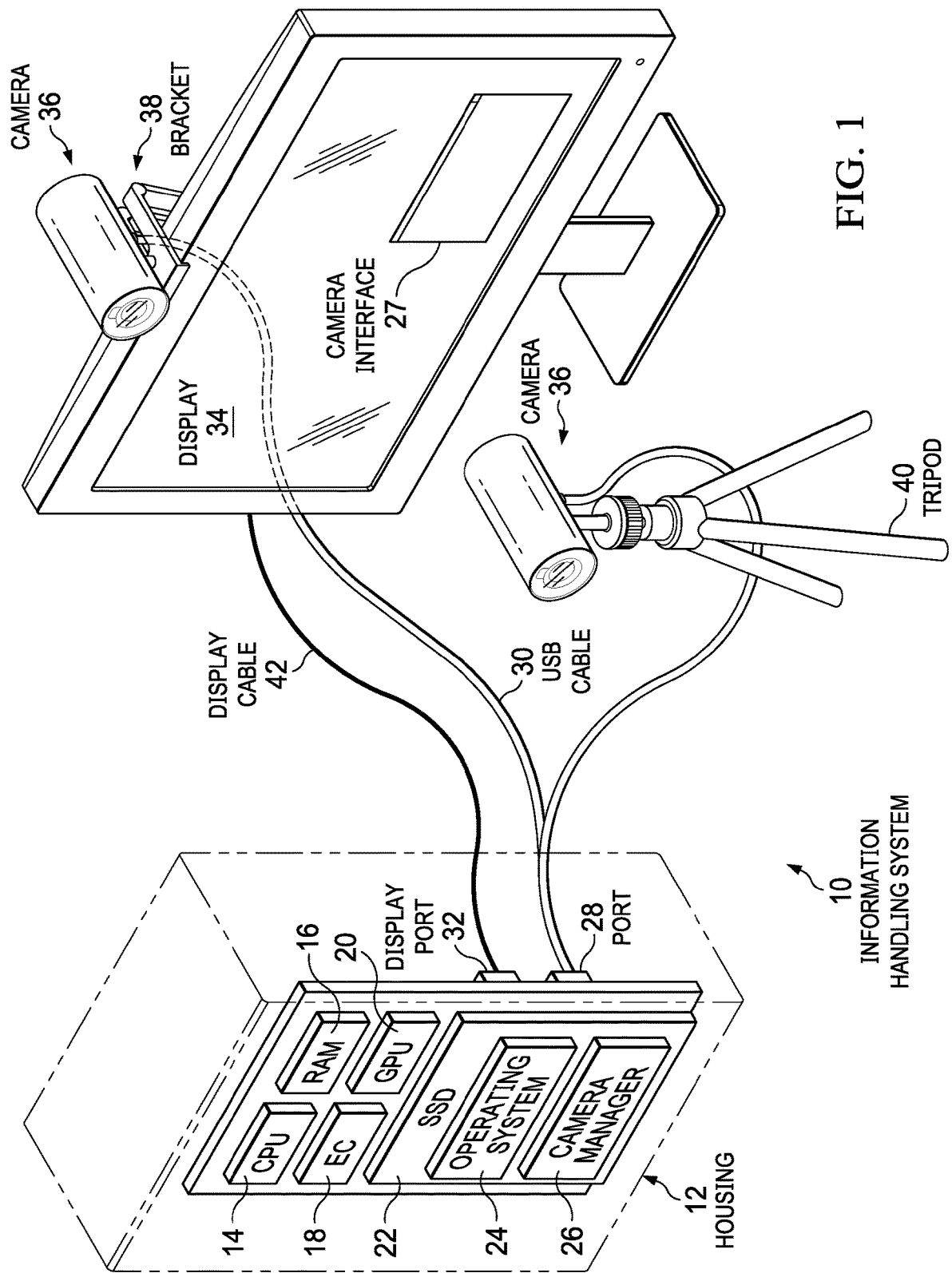
FIG. 1 depicts a block diagram of an information handling system interfaced with a peripheral camera that supports videoconferencing.

Referring now to FIG. 1, a block diagram depicts an information handling system 10 interfaced with a peripheral camera 36 that supports videoconferencing. In the example embodiment, information handling system 10 processes information with processing components disposed in a housing 12. For example, a central processing unit (CPU) 14 executes instructions that process information with the instructions and information stored in a random access memory (RAM) 16. An embedded controller 18 manages physical operating conditions within housing 12, such as application of power and maintaining thermal constraints, and also manages interactions with peripheral devices, such as a keyboard and mouse. A graphics processing unit (GPU) 20 interfaces with CPU 14 and further processes the information to generate visual images, such as by generating pixel values that define pixel colors for presentation at display 34. A solid state drive (SSD) 22 provides non-transitory memory, such as flash, that stores information during system power down states. For example, the instructions may include an operating system 24 stored in SSD 22 and retrieved to RAM 16 with boot code executed on embedded controller 18 at system power up.

GPU 20 interfaces through a display port 32 and display cable 42 with a display 34 that presents information as visual images, such as by scanning pixel values to a display panel having rows and columns of pixels. In the example embodiment, a first peripheral camera 36 is illustrated in two different positions relative to display 34. A bracket 38 couples camera 36 to an upper side of display 34 to capture visual images of an end user viewing display 34. A second peripheral camera 36 rests on a tripod 40 to capture visual images of an end user viewing the display from a location in between the end user and the display. Multiple viewing locations for camera 36 provides an end user with increased flexibility regarding the quality of a visual image captured by camera 36. As is described below in greater detail, camera 36 may selectively detach and attach from each of bracket 38 and tripod 40, such as with a magnetic coupling device, as described in U.S. patent application Ser. No. 17/325,503, filed May 20, 2021, by Celia Law et al., which is incorporated herein as if fully set forth. Camera 36 captures visual images and communicates the visual images through a USB cable 30 and to a USB port 28 for use by information handling system 10, such as to support a videoconference. In the example embodiment, a camera manager 26, such as driver of operating system 24, provides a camera interface 27 for presentation at display 34 to manage camera settings and present visual images captured by camera 36.

Figure 2A:
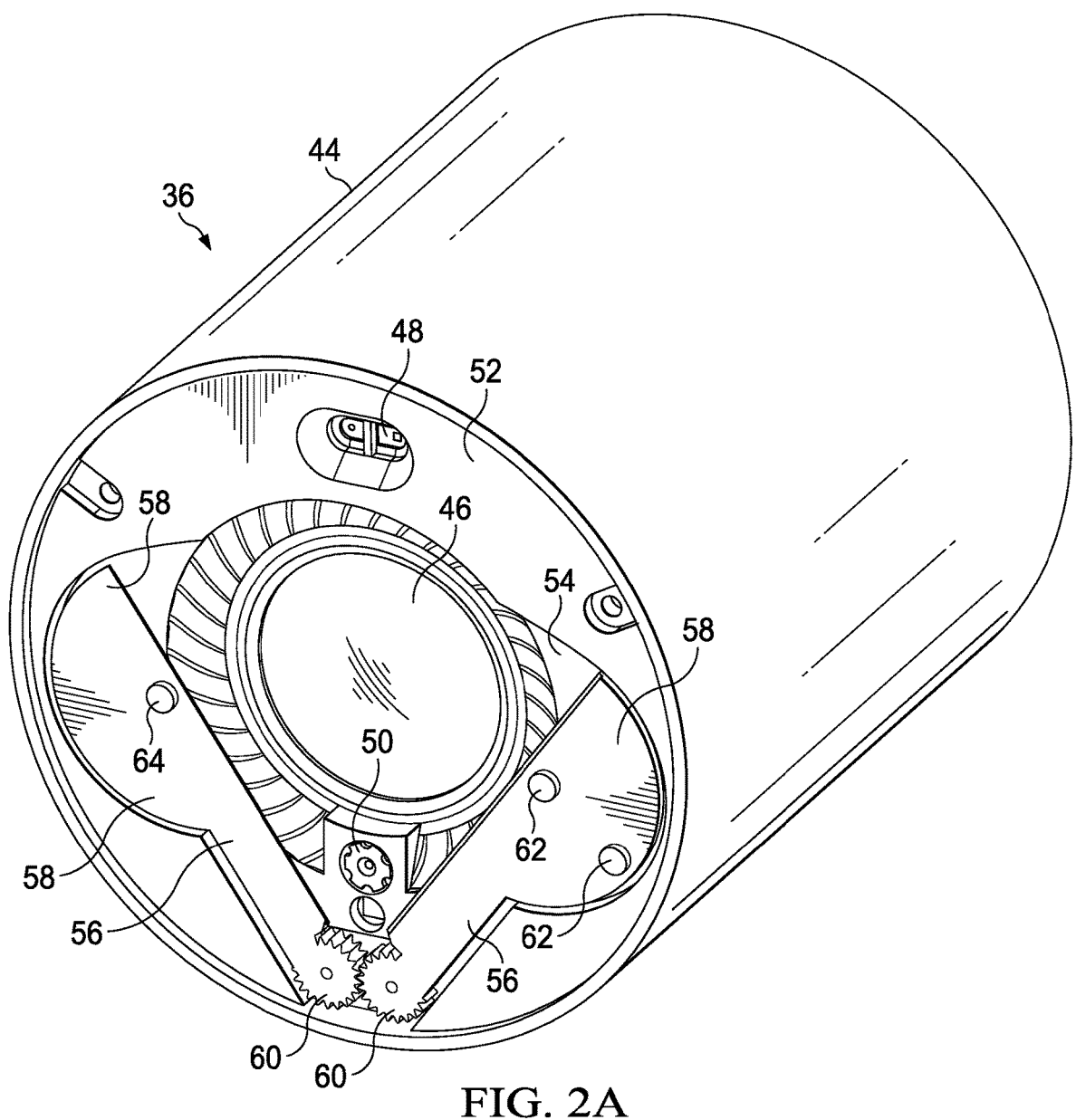

Referring now to FIGS. 2A, 2B, 2C, 2D and 2E, a dual leaf camera security system is depicted for selectively blocking and providing access to a camera module disposed in a camera housing. FIG. 2A depicts a front view of camera 36 disposed in a cylinder housing 44 to expose a camera module 46 that captures visual images, such as to support a videoconference. In the example embodiment, a bezel 52 covers the end of cylindrical housing 44 and has a central opening through which camera module 46 is exposed to capture visual images. Bezel 52 has a user presence detection sensor 48 exposed through an upper opening that detects end user presence, such as a time of flight sensor that detects end user presence with infrared light reflections or an ultrasound sensor that detects end user presence with Doppler effects for reflected sound energy. Bezel 52 has an infrared camera 50 exposed through a lower opening that provides depth camera functions, such as by emitting infrared illumination that reflects from targets to a camera that senses the infrared spectrum to measure distance. For example, infrared camera 50 supports facial recognition based upon depth measurements of a face in its field of view. As is set forth in greater detail below, user presence determinations and facial recognition are performed with a processing resource integrated in camera 36 and then communication to an information handling system interfaced with camera 36.

To provide security against unauthorized capture of visual images by camera module 46, first and second opposing cover members 56 rotationally couple to bezel 52 at a lower position below infrared camera 50. Each cover member 56 rotationally couples at a gear end terminating with gears 60 and extends to a cover end 58 having a semicircular shape, each semicircular shape having a radius substantially equal to the radius of the camera module 46 opening so that rotation of the cover ends 58 to meet over camera module 46 blocks capture of visual images by camera module 46. Gears 60 of each cover member 56 engage to coordinate opening and closing of cover members 56. In the example embodiment, magnets 62 disposed in one cover member 56 provide and indication of cover member position, such as to a Hall sensor disposed in cylindrical housing 44. A ferromagnetic material 64, such as steel, is attracted to magnet 62 to aid in holding cover ends 58 together when positioned over camera module 46. Bezel 52 has a beveled region 54 that helps to guide movement of cover members 56 between an open position that exposes camera module 46 and a closed position that blocks camera module 46.

Figure 2D:
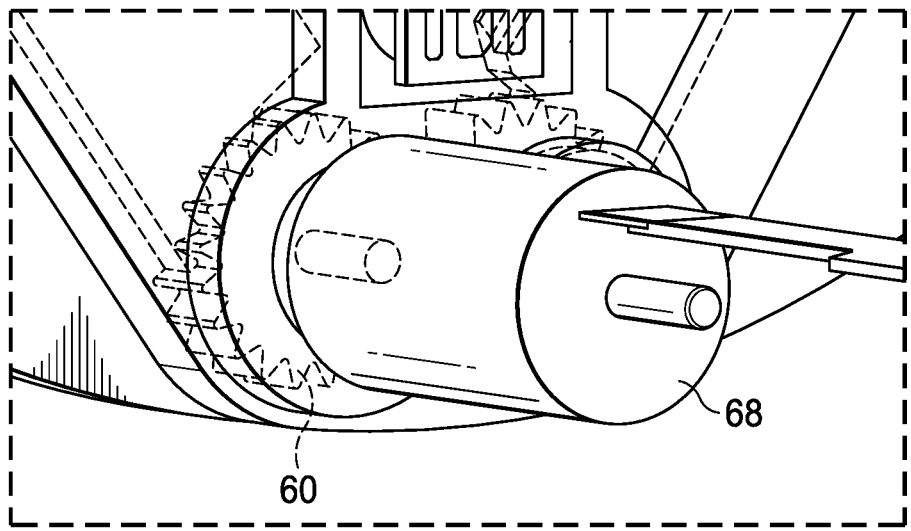
Figure 2E:
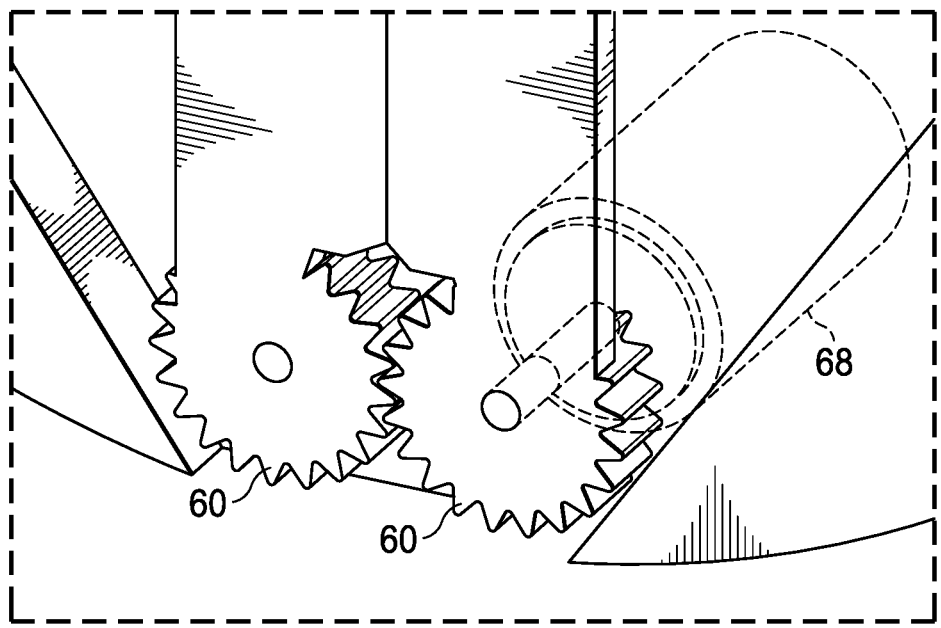

FIG. 2B depicts camera 36 with cover members 56 rotated about gears 60 to move cover ends 58 over camera module 46. In the closed position, cover members 56 also cover infrared camera 50 to prevent unauthorized access; however, user presence detection sensor 48 remains exposed at bezel 52 so that camera 36 may be leveraged by an interfaced information handling system to monitor user presence and absence. FIG. 2C depicts an inner rear view of bezel 52 showing alignment of camera module 46 with the bezel camera opening. An actuator 68, such as a step motor, interfaces with one of the gears 60 to turn the gear for opening and closing cover members 56. A Hall sensor 66 couples to the beveled region 54 to detect magnets 62 for feedback of the cover member 56 position so that actuator 68 opens and closes a desired amount. In the example embodiment, a cover end 58 may include multiple magnets 62 to provide a signal for actuator 68 control at both the open and closed positions. In an alternative embodiment, multiple Hall sensors may be disposed at the rear side of bezel 52 to further define the position of cover members 56. FIG. 2D depicts a rear inner close up view of actuator 68 coupled to gear 60 to turn gear 60 so that cover members 56 open and close. FIG. 2E depicts a front close up view of cover member gears 60 engaged and rotated by actuator 68 to a closed position.

Figure 3:
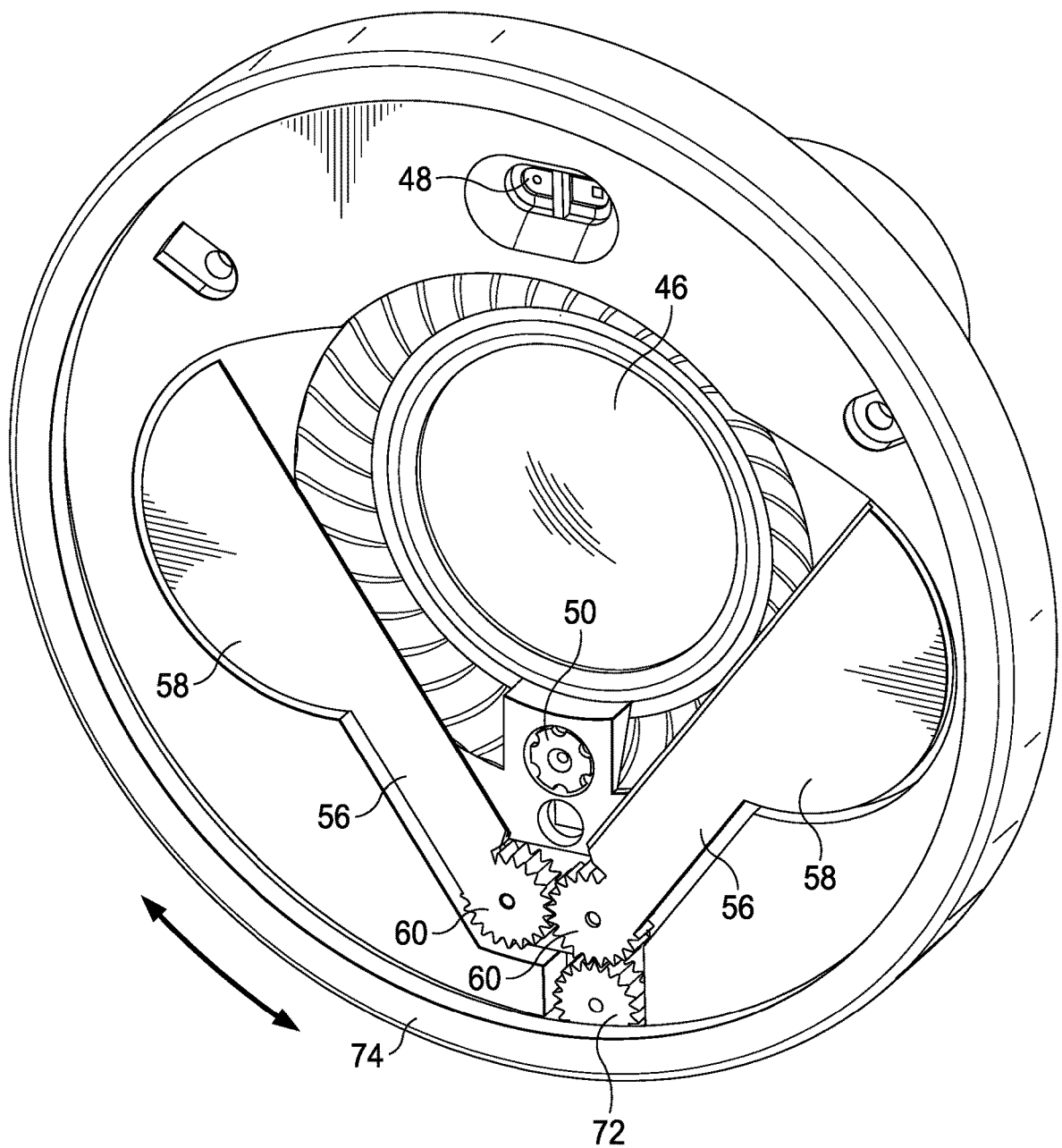
FIG. 3 depicts a front perspective view of an alternative embodiment of cover members configured for automated and manual actuation.

Referring now to FIG. 3, a front perspective view depicts an alternative embodiment of cover members 56 configured for automated and manual actuation. In the example embodiment, a circular frame cap 74 rotationally couples over bezel 52 and interfaces with a manual actuation gear 72 so that, as circular frame cap 74 rotates gear 72 also rotates. Rotation of gear 72 translates to gears 60 so that rotation of circular frame cap in opposing directions opens and closes cover members 56 to place cover ends over camera module 46 or to opposing sides as defined by beveled region 54.

Figure 4:
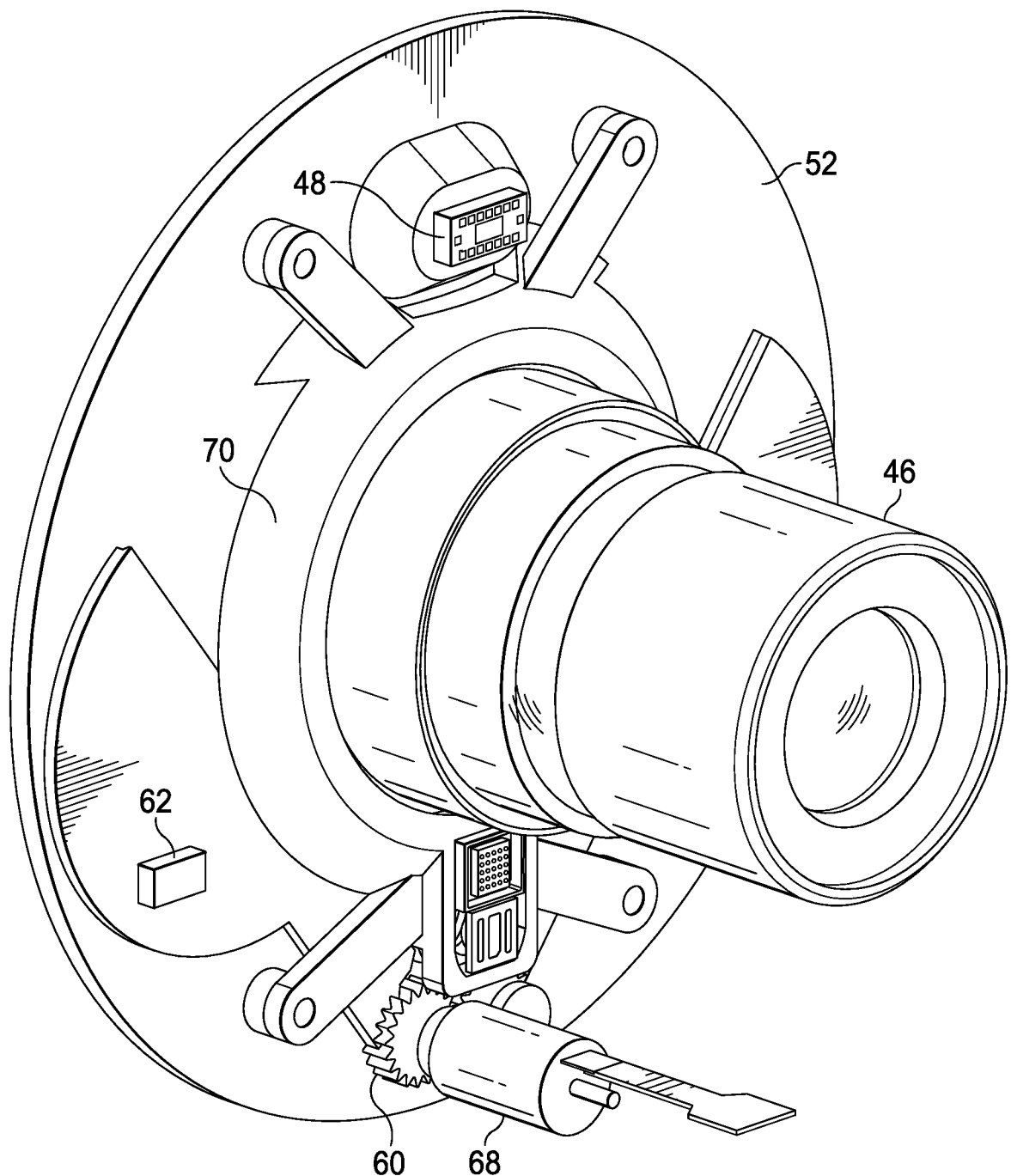
FIG. 4 depicts a rear inner view of the dual leaf cover members disposed behind the bezel.

Referring now to FIG. 4, a rear inner view depicts the dual leaf cover members 56 disposed behind bezel 52. In the example embodiment, rotationally coupling each gear 60 end of the cover members 56 at an interior rear side of bezel 52 hides the cover ends of cover members 56 when not extended over camera module 46. A frame 70 couples around camera module 46 and to the rear side of bezel 52 to hold cover members 56 in place and gears 60 engaged with actuator 68. A magnet 62 couples to one of the cover members 56 to support a Hall sensor detection of cover member position, as described in greater detail above. One advantage of rear mount of cover members 56 is that the beveled region is eliminated from the front of bezel 52 to provide a cleaner appearance. In one alternative embodiment, a beveled region may be formed on the rear side of bezel 52 to help guide motion of cover members 56 between the open and closed positions.

Figure 5B:
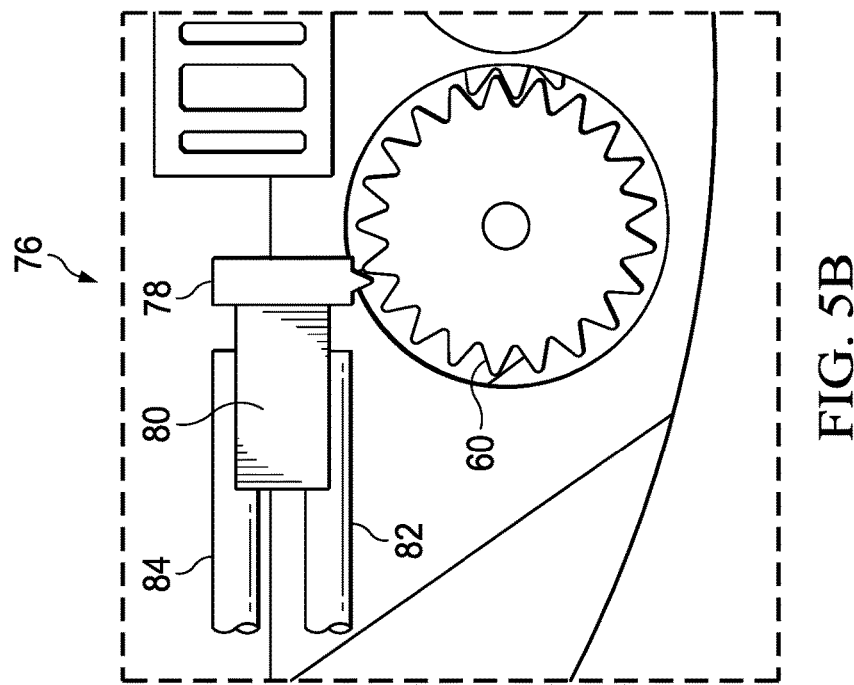
FIGS. 5A and 5B depict the peripheral camera bezel rear side with a piezoelectric actuator coupled to a cover member gear for moving the cover members between open and closed positions.
Figure 5A:
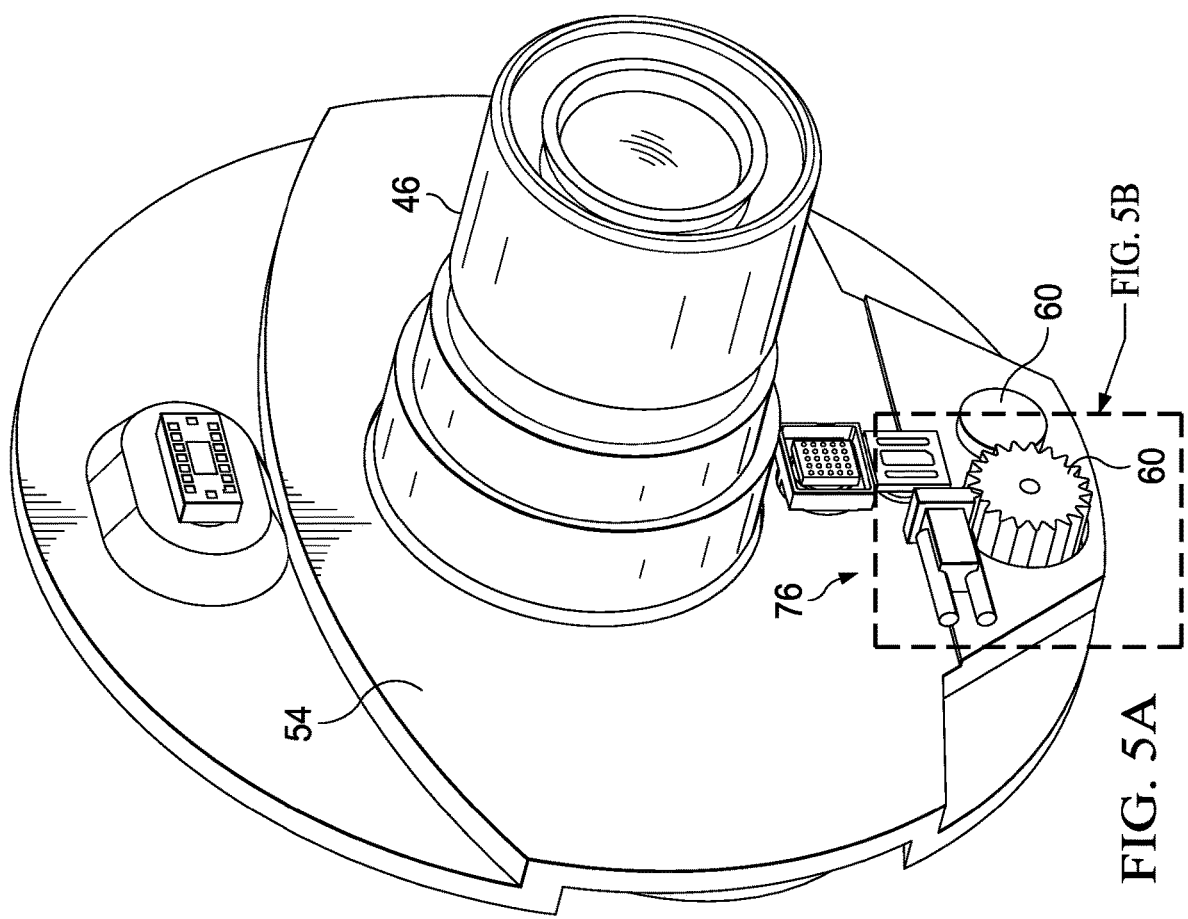

Referring now to FIGS. 5A and 5B, the peripheral camera bezel 52 rear side is depicted with a piezoelectric actuator 76 coupled to a cover member gear 60 for moving the cover members between open and closed positions. Piezoelectric actuator 76 relies upon a piezoelectric effect to generate a vibration that translates to movement gear 60. For example, a ceramic AE series resin coated piezoelectric actuator by KEMET, a YAGEO company may be used. As illustrated by FIG. 5B, a piezoelectric element 80 has a gear pin cap 78 coupled at an end and engaged with a gear 60 so that actuation with current from wires 82 and 84 provide a rapid pushing and pulling action that rapidly rotates gear 60 to open and close the cover members. The vibration translates to gear pin cap 78 to slightly lift the end of the pin over the individual gears, resulting in rapid actuation of gear 60 in open or close directions.

Figure 6A:
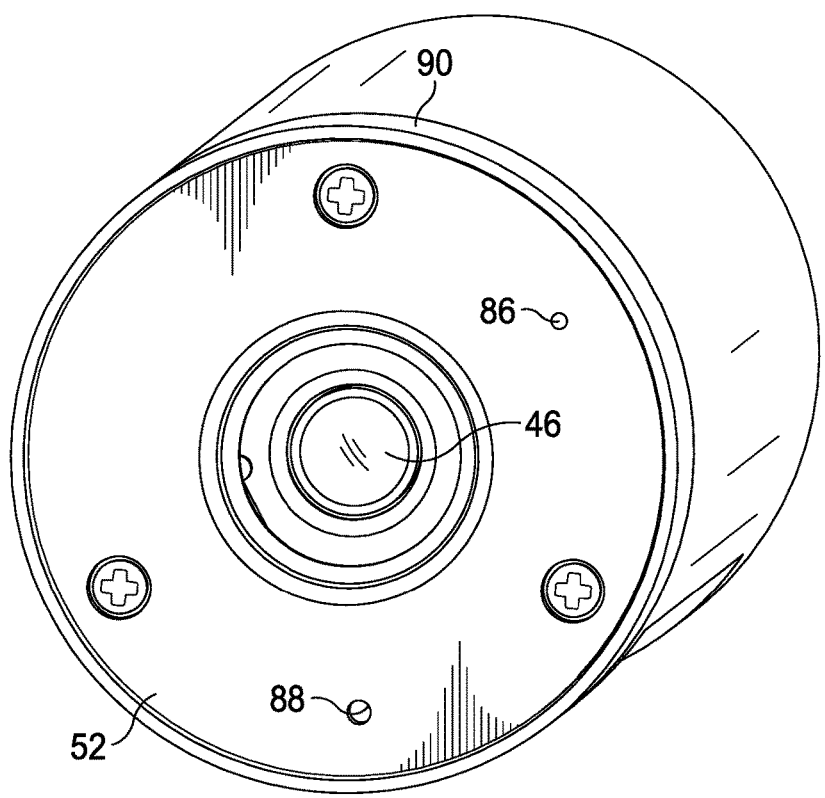
FIGS. 6A, 6B, 6C, and 6D depict an alternative embodiment of a camera that selectively covers a camera module with shutter members.
Figure 6B:
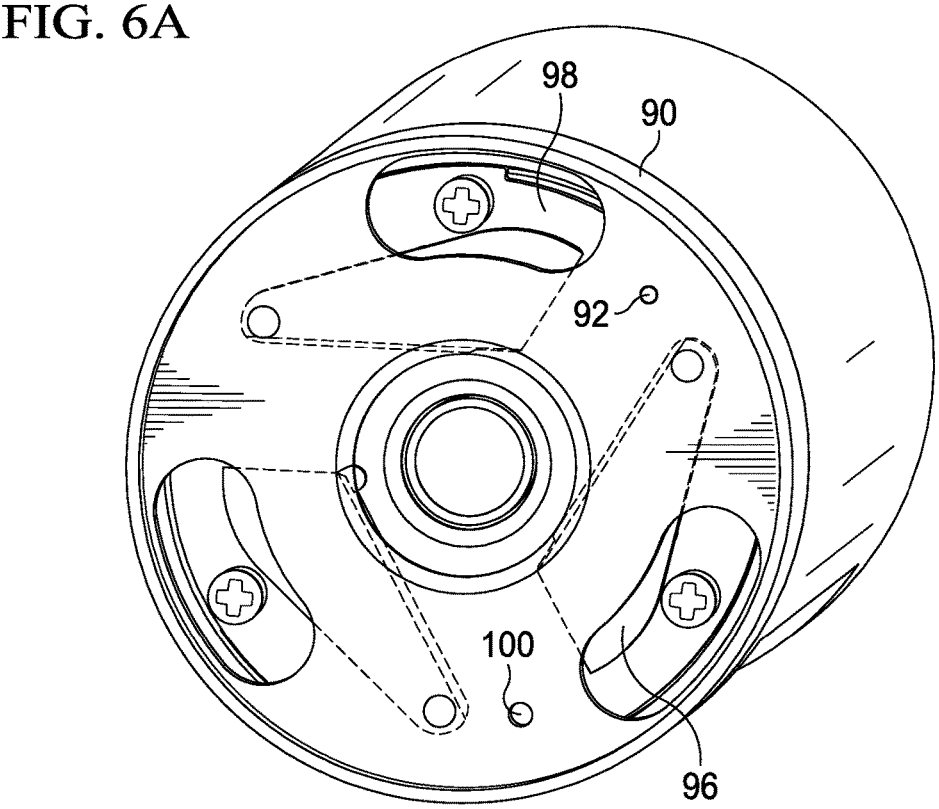
Figure 6C:
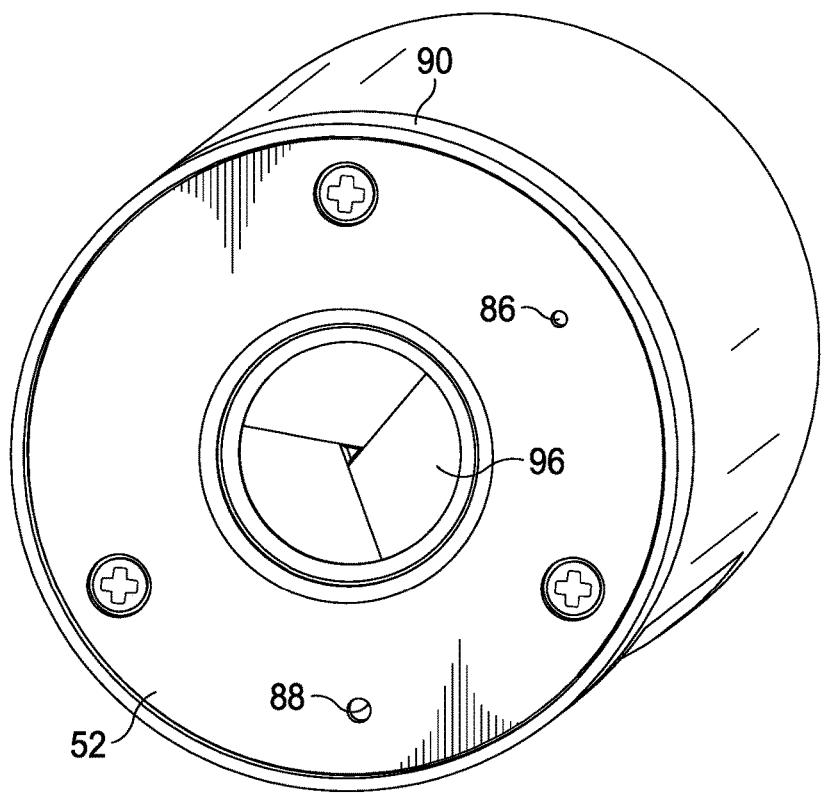
Figure 6D:
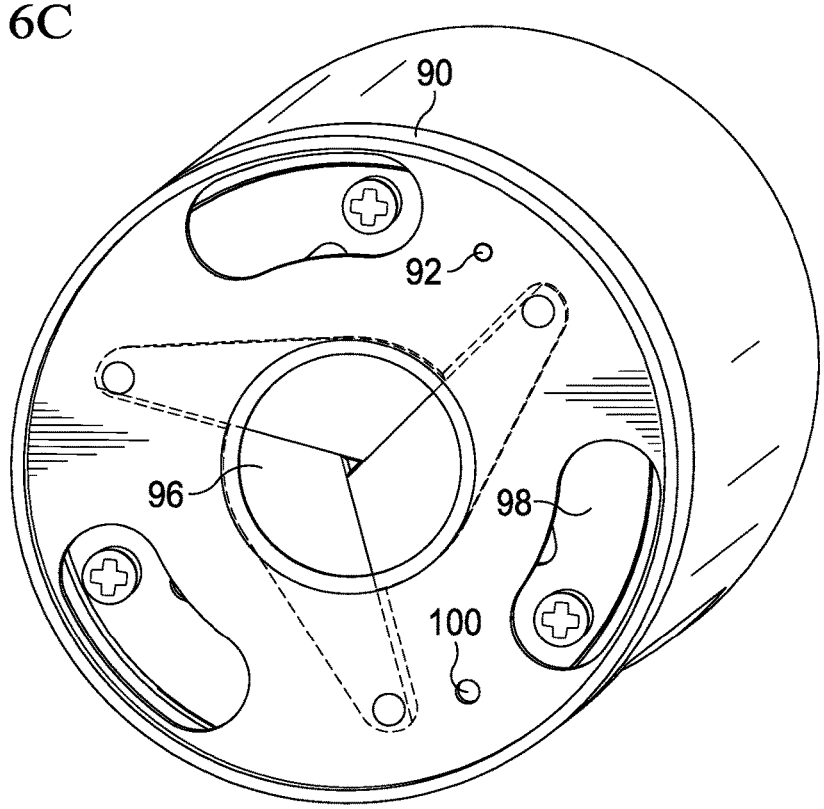

Referring now to FIGS. 6A, 6B, 6C, and 6D, an alternative embodiment of a camera 36 is depicted that selectively covers a camera module 46 with shutter members 96. FIG. 6A depicts camera 36 with a front bezel 52 having plural openings that each provide access to underlying functional devices. Camera module 46 has access to external light through a central opening, as described above. In addition, an LED opening 86 allows illumination to exit from behind bezel 52 and a microphone opening 88 provides access for sound energy to reach an audio microphone disposed behind bezel 52. A cap 90 rotationally couples to a front face of camera 36 to rotate and allow selective opening and closing of the openings in bezel 52 relative to their underlying functions. FIG. 6B depicts camera 36 with the front bezel removed to show an underlying shutter plate 98 coupled in a fixed manner relative to camera 36 and a front surface of cap 90 that includes a microphone opening 100 and LED opening 92. Shutter members 96 couple to cap 90 and to shutter plate 98 so that rotation of cap 90 relative to fixed shutter plate 98 extends and retracts shutter members 96 relative to a central opening of cap 90 through which camera module 46 captures visual images. FIG. 6C depicts cap 90 rotated relative to the underlying shutter plate and to bezel 52, which has a fixed orientation relative to camera 36. Rotation of cap 90, in addition to extending and retracting shutter members 96, aligns and misaligns openings 100 and 92 of cap 90 to openings 86 and 88 so that the LED and microphone functions are blocked from access through bezel 52. FIG. 6D depicts camera 36 with bezel 52 removed and shutter members 96 extended over the camera module. The openings 92 and 100 in cap 90 rotate as shutter members 96 extend while the underlying functions are provided by stationary components disposed on shutter plate 98.

Figure 7A:
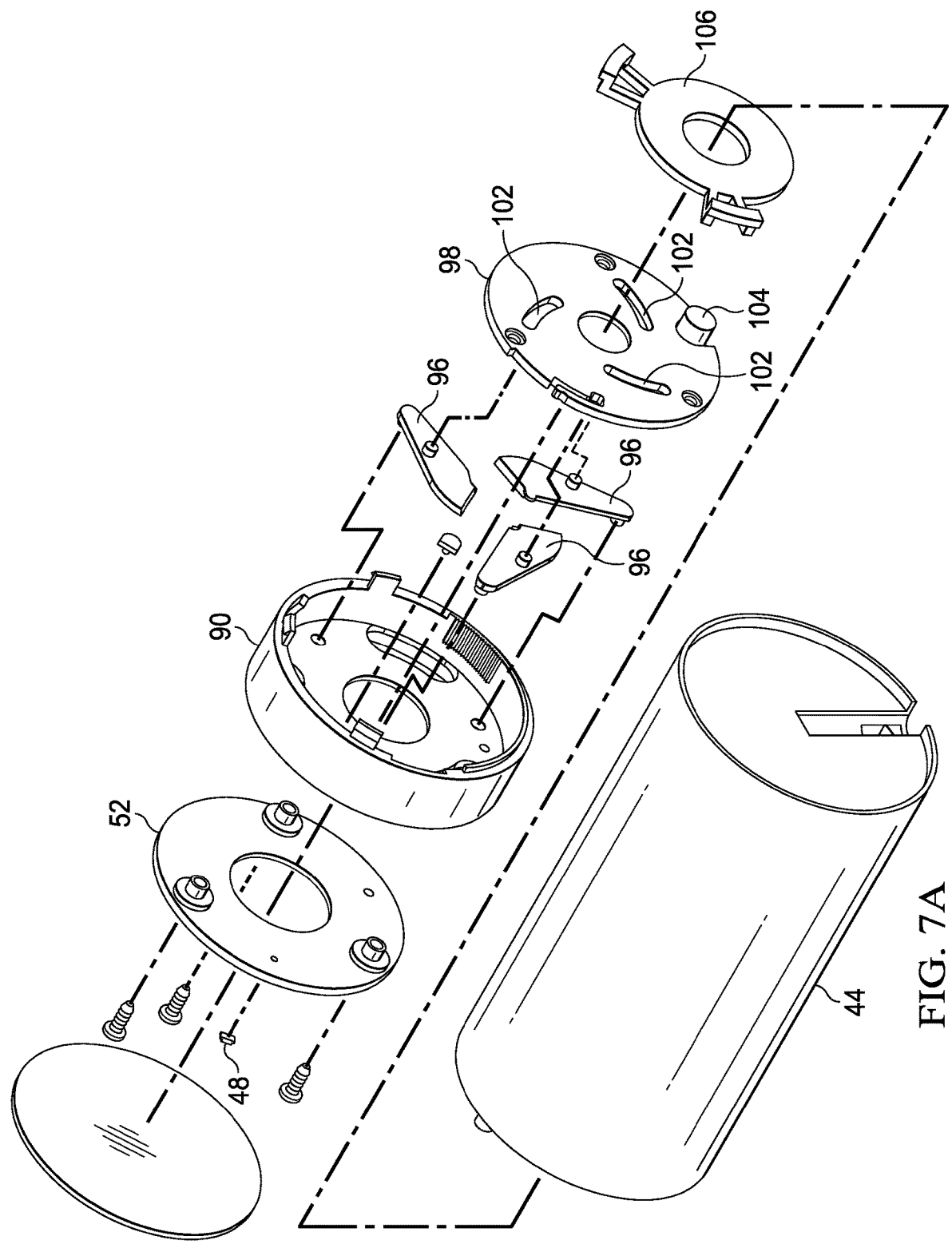
FIGS. 7A and 7B depict an exploded view of an embodiment that covers a camera module with shutter members.
Figure 7B:
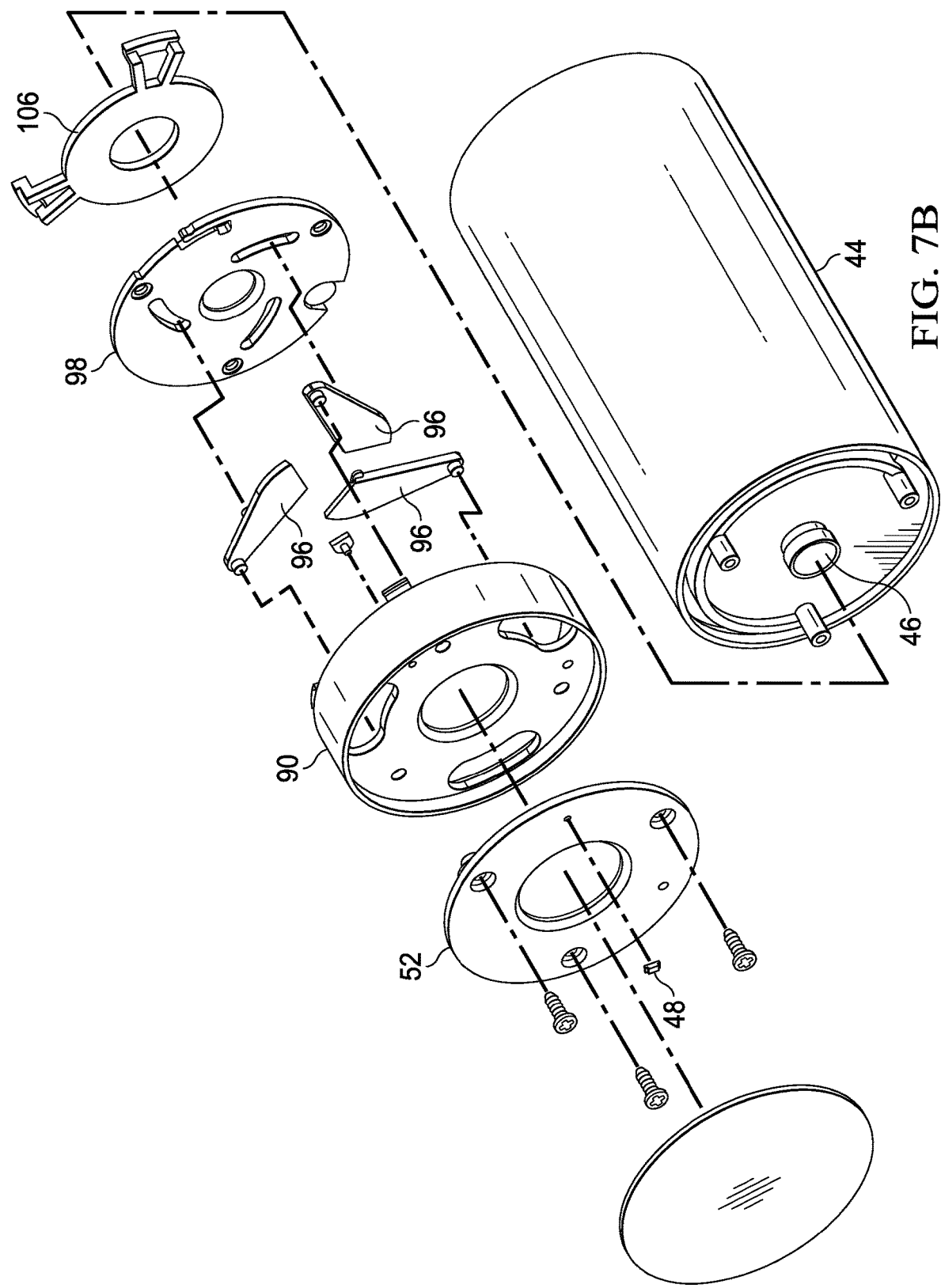

Referring now to FIGS. 7A and 7B, an exploded view depicts an embodiment that covers a camera module 46 with shutter members 96. In the example embodiment, camera cylindrical housing 44 is manufactured by extruding aluminum into a cylinder having open front and rear faces. A camera module 46 couples at the front face of housing 44 to capture visual images, such as that support videoconferences, and provides the visual images to internal processing resources for communication to an information handling system, as described in greater detail below. At the front face, a bezel 52 couples at a fixed orientation relative to housing 44, such as with screws that pass through bezel 52, through a support 106 and into threads of housing 44. Bezel 52 may have a glass cover and can support a user presence detection sensor 48 at the front surface, such as a time of flight or ultrasonic Doppler sensor. Exposing user presence detection sensor 48 at a front surface allows constant monitoring of user presence even as the camera module and infrared camera operational states change. Support 106 fits around camera module 46 to provide a robust brace against torsional forces generated by shutter member 96 movement. In addition, support 106 has a circumference that avoids interference with movement of shutter members 96 within guides 102 of shutter plate 98.

Circular cap 90 rotationally couples over the front face of housing 44 captured by the screws that couple bezel 52 to housing 44. The screws pass through openings of circular cap 90 to define a degree of rotation of circular cap 90 relative to bezel 52 and housing 44. The screws also pass through openings of shutter plate 98 to couple shutter plate 98 in a fixed location relative to bezel 52 and housing 44.

Circular cap 90 captures shutter members 96 against shutter plate 98 so that pins extending from the front side of each shutter member 96 rotationally couples to the rear side of circular cap 90 and a pin extending from the rear side of each shutter member 96 slidingly inserts into a guide of shutter plate 98. As circular cap 90 rotates relative to shutter plate 98, guides 102 drive shutter members 96 to travel over and away from the center opening of circular cap 90. A microphone 104 couples shutter plate 98 to align with a microphone opening of circular cap 90 when shutter members 96 move away from the central opening and misalign with the microphone opening of circular cap 90 when shutter members 96 extend over the central opening to block camera module 46. Mechanical blocking of microphone 104 when camera module 46 is blocked for security adds a layer of security against unauthorized access of microphone information when the camera is powered down. As is described in greater detail below, mechanical blocking and access of camera module 46, microphone 104, an infrared camera and a user presence detection sensor may be individually managed based upon the size and relationship of openings in circular cap 90 to provide secure access with the camera.

Figure 8:
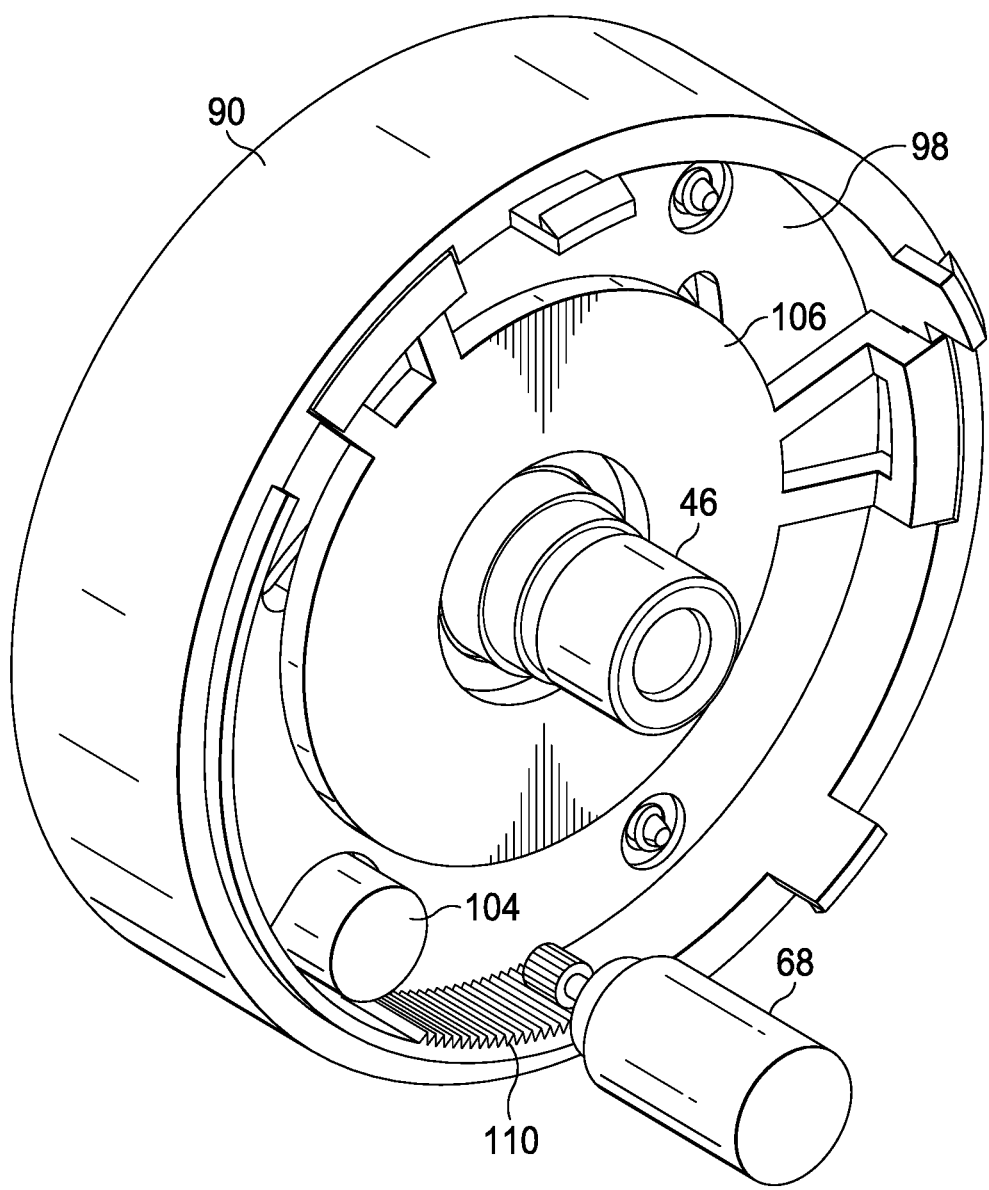
FIG. 8 depicts a rear view of a circular cap having an actuator adapted to provide automated access to different camera functions.
Figure 9A:
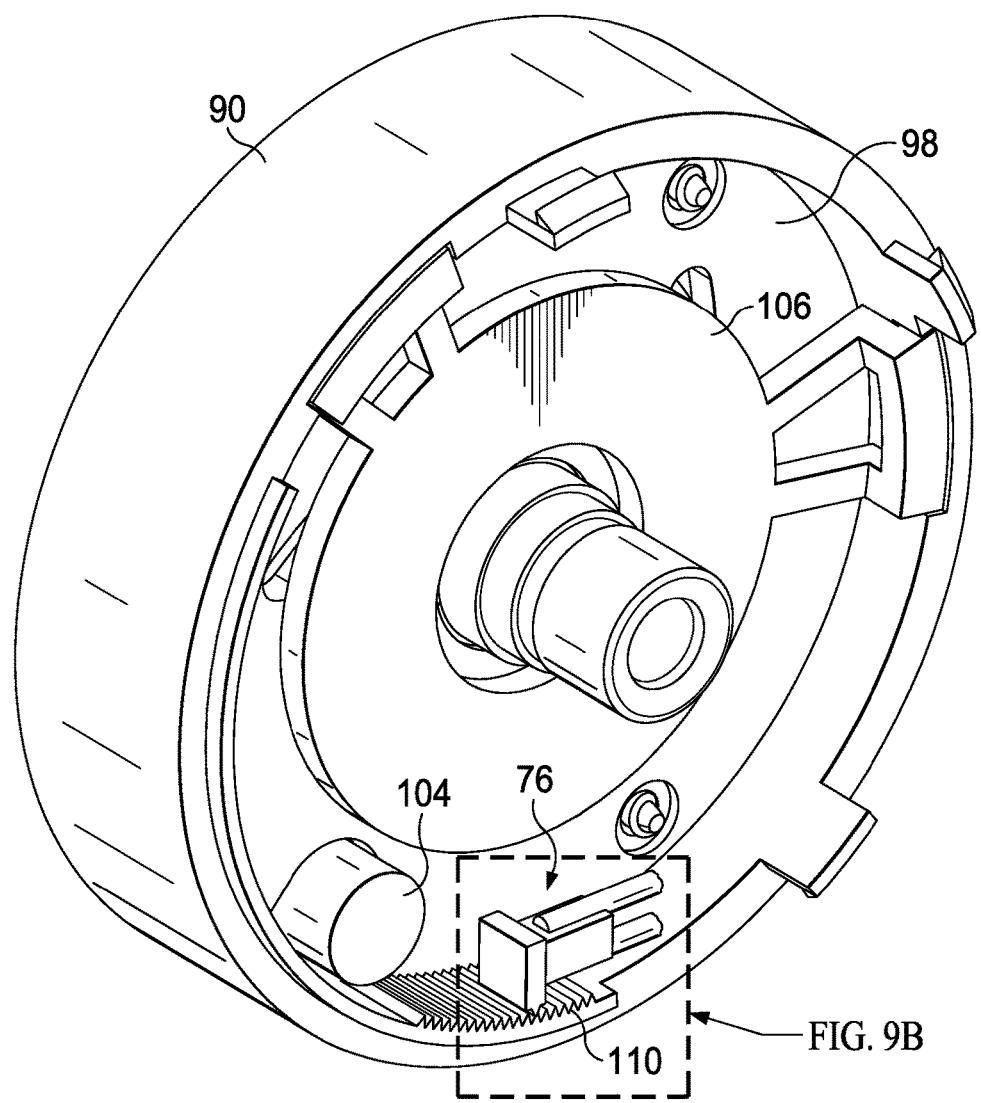
FIGS. 9A and 9B depict a rear view of the circular cap configured with a piezoelectric actuator to provide automated access to different camera functions.
Figure 9B:
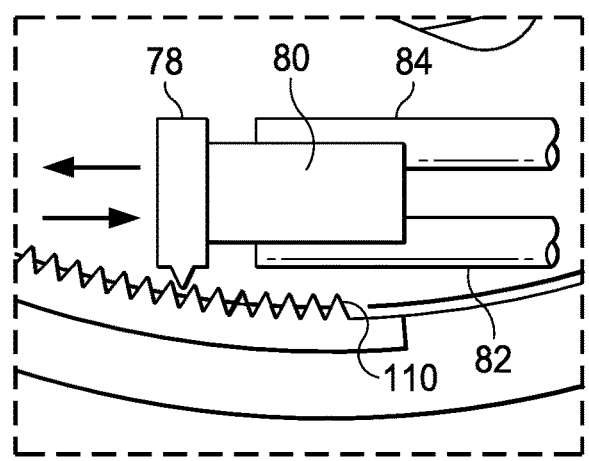

Referring now to FIG. 8, a rear view of a circular cap depicts an actuator adapted to provide automated access to different camera functions. In the example embodiment, actuator 68 engages with gears formed in the inner circumference of circular cap 90 to rotate circular cap 90 relative to the camera housing. Shutter plate 98 and support plate 106 remain stationary relative to the camera housing and step motor 68 so that the rotation of circular cap 90 causes the shutter members to extend and retract and also causes alignment and misalignment of microphone 104 with a microphone opening formed in circular cap 90. FIGS. 9A and 9B depict a rear view of the circular cap configured with a piezoelectric actuator 76 to provide automated access to different camera functions. Piezoelectric element 80 has a gear cap 78 that vibrates responsive to current from wires 82 and 84 to engage gears 110 so that circular cap 90 is pushed or pulled to rotate. As is described above, piezoelectric actuator 76 provides a rapid response time for rotation of the circular cap. In addition, piezoelectric actuator aids with assembly by coupling to shutter plate 98 rather than performing actuation from within the camera.

Figure 10A:
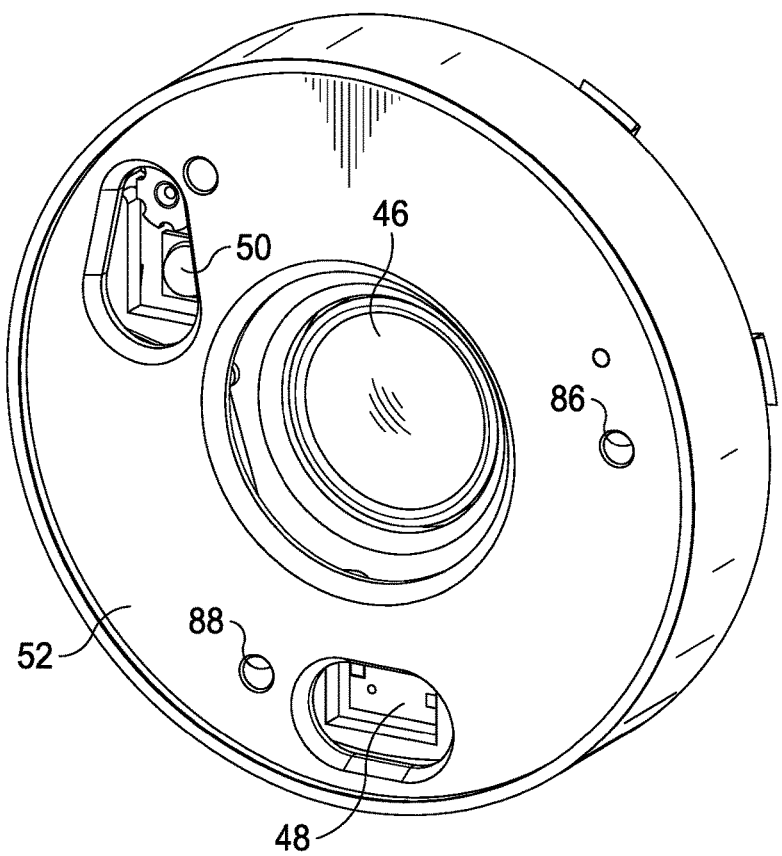
FIGS. 10A and 10B depict an example embodiment of a front face of the circular cap illustrating underlying camera functions covered and uncovered.
Figure 10B:
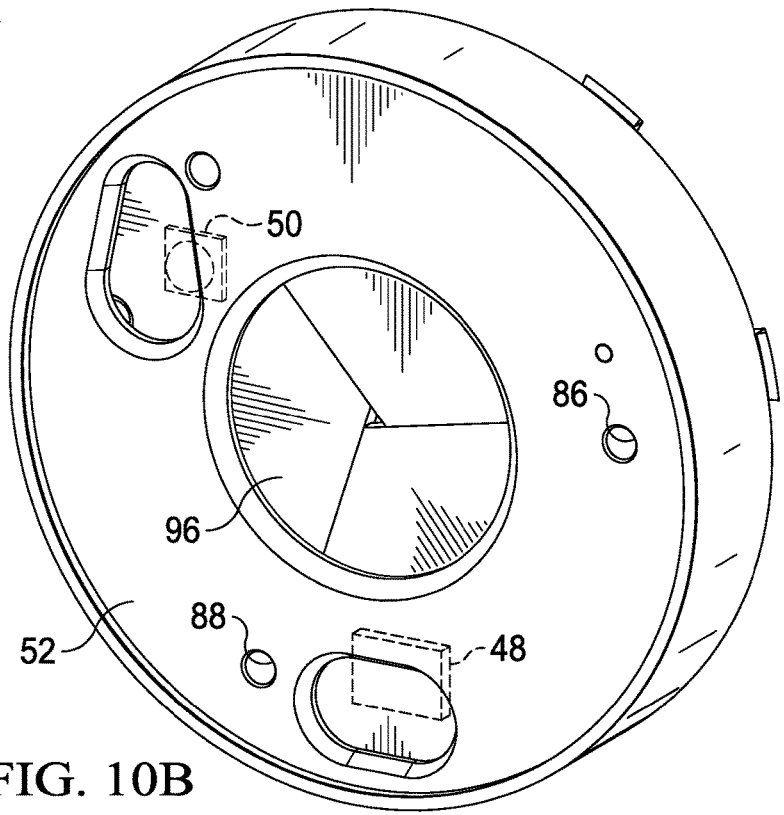

Referring now to FIGS. 10A and 10B, an example embodiment of a front face of the circular cap 90 illustrates underlying camera functions covered and uncovered. FIG. 10A depicts camera module 46, user presence detection sensor 48, infrared camera 50 and a LED 86 exposed through alignment of openings formed in circular cap 90. FIG. 10B depicts shutter members 96 extended over camera module 46 by rotation of circular cap 90 to engage shutter members 96 in guides formed in the shutter plate. In addition, rotation of circular cap 90 relative to the underlying shutter plate misaligns the openings of circular cap 90 so that user presence detection sensor 48, infrared camera 50 and LED 86 are blocked. The physical blocking of these underlying components enhances security by reducing the risk that an unauthorized user will access camera functions, such as to spy on an end user. In the example embodiment, all camera functions become available and unavailable in a coordinate manner, such as in concert with opening and closing of shutter members 96. In an alternative embodiment, camera functions may be made available on an individual basis. For instance, in one embodiment, a user presence detection sensor is exposed at the front of cap 90 so that user presence detection remains available at all times. In an alternative embodiment, functions are provided in security increments where initial functions verify authorized use before full camera functionality is available. For example, an initial rotation of cap 90 exposes only a time of flight sensor so that a request for camera access is first verified by a user presence as opposed to an unauthorized remote access. Once a user presence is confirmed, further rotation of cap 90 exposes an infrared camera to support facial identification of the end user. If the end user identity is verified, additional rotation may expose just a microphone in the event the user only wants to use audio functions and then the camera module. The delay in opening shutter members 96 may be provided by forming guides that allow cap rotation without movement of the shutter members until all other functions are exposed.

Figure 11:
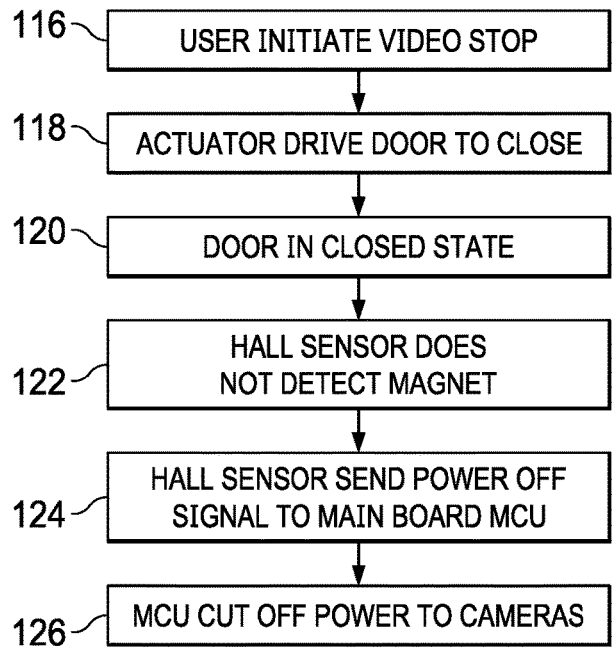
FIG. 11 depicts a flow diagram of a process for managing security at completion of a usage session with a peripheral camera.

Referring now to FIG. 11, a flow diagram depicts a process for managing security at completion of a usage session with a peripheral camera. The process starts at step 116 with user initiation of a video stop, such as closing a videoconference application running on an information handling system interfaced with the peripheral camera. At step 118, the actuator drives the cover members or shutter to close. At step 120 the covering of the camera module is confirmed, such as by detection of a door position with a Hall sensor. At step 122, failure to detect a magnet with the Hall sensor indicates that the camera module is covered so that, at step 124, the Hall sensor sends a power off signal to the camera processing resource, such as a microcontroller. At step 126 the camera processing resource cuts off power to the camera.

Figure 12:
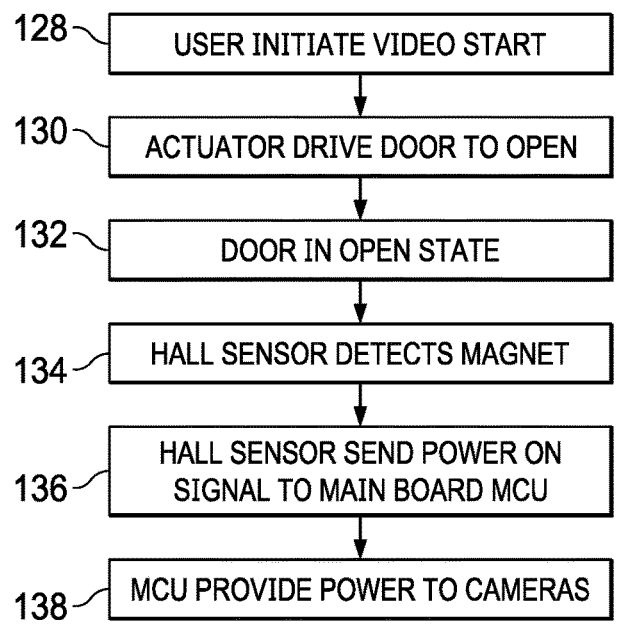
FIG. 12 depicts a flow diagram of a process for managing security at initiation of a usage session with a peripheral camera.

Referring now to FIG. 12 a flow diagram depicts a process for managing security at initiation of a usage session with a peripheral camera. The process starts at step 128 with an end user initiating a video start, such as by starting a videoconference application at an information handling system interfaced with the peripheral camera. At step 130 an actuator drives open the cover members or shutter to expose the camera module so that at step 132 the shutter or cover member is in an open state. At step 134 a Hall sensor detects alignment with a magnet so that at step 136 the Hall sensor sends a power on signal to the camera process resources, which at step 138 commands power to the camera.

Figure 13:
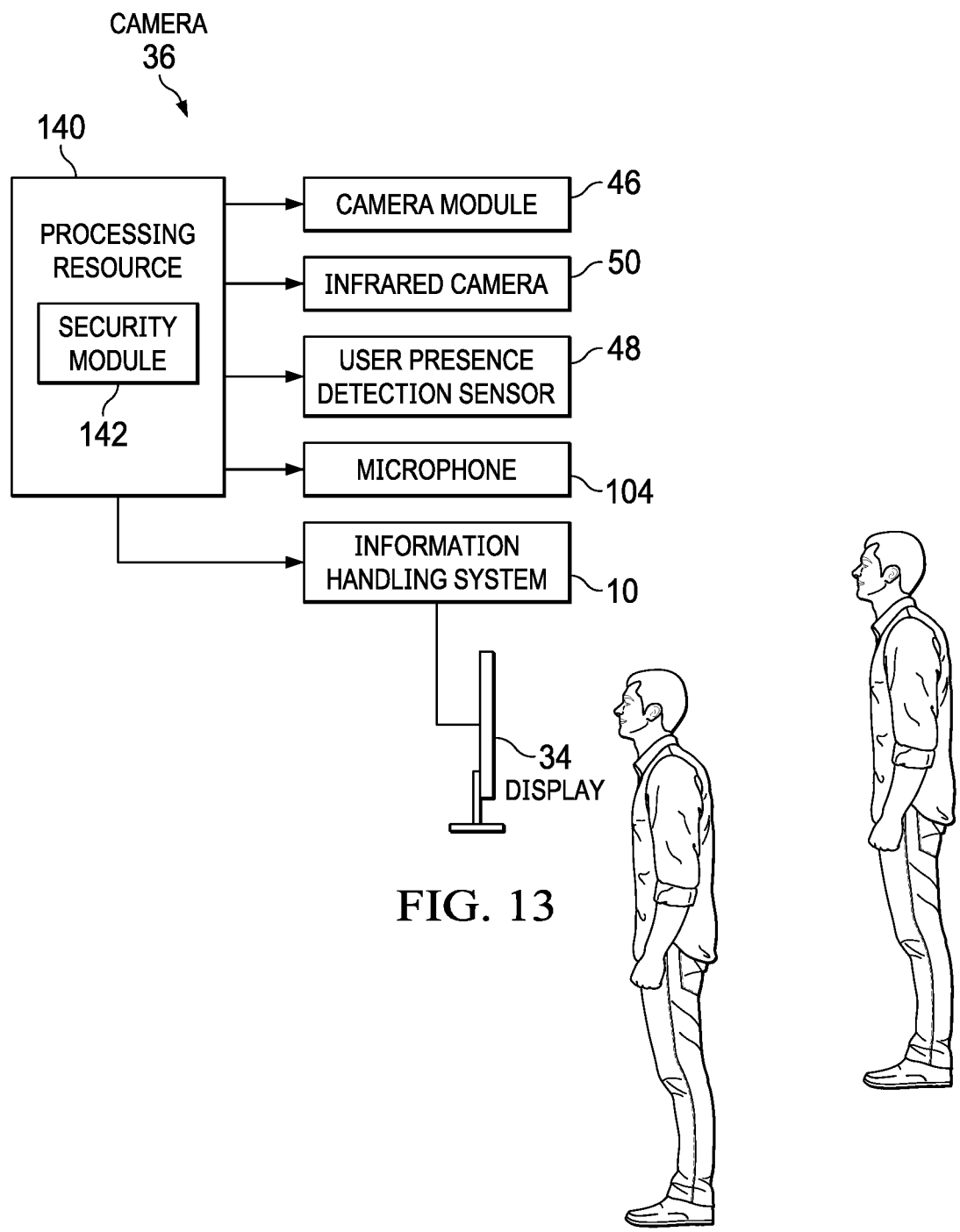
FIG. 13 depicts a block diagram of a peripheral camera configured to support security at a peripheral display interfaced with an information handling system to present visual images.

Referring now to FIG. 13, a block diagram depicts a peripheral camera 36 configured to support security at a peripheral display 34 interfaced with an information handling system 10 to present visual images. Camera 36 includes a processing resource 140, such as a microcontroller unit, that executes a security module 142 to enhance security of a display 34 that presents information as visual images from an information handling system 10 interfaced with peripheral camera 36. As an initial matter, camera 36 retrieves from information handling system 10 a size of the display and, if available, a position of the display relative to the camera 36. The display size is applied to determine a viewing distance at which an unauthorized end user might be able to view information presented at peripheral display 34. In one example embodiment, information handling system 10 may also provide additional parameters for determining a security distance, such as the size of the letter with which information is presented and the context included like picture and video window size. For instance, a driver of peripheral camera 36 executing on information handling system can send a display size adjusted for security factors so that, the larger the display the more sensitive peripheral camera 36 is to taking security actions that limit access to presented visual images, such as dimming the display or putting up a security visual image in the place of sensitive visual image information.

Security module 142 monitors with user presence detection sensor 48 at a viewing location of peripheral display 34 to determine if an end user is present. The user presence detection sensor 48 may include a time of flight sensor that relies upon reflected infrared light or an ultrasonic sensor that relies upon Doppler effects associated with reflected sound energy. If an end user is detected, security module 142 initiates infrared camera 50 to perform facial recognition of the end user. Once the end user is verified as authorized, security module 142 makes microphone 104 and camera module 46 available to the end user. In one embodiment, security module 142 controls an actuator that covers and uncovers each functional asset as authorized, such as with different amounts of cap rotation to selectively expose each of user presence detection sensor 48, infrared camera 50, microphone 104 and camera module 46. During end user activity, security module 142 continues to monitor user presence detection sensor 48 to determine if a second end user is detected in the viewing position of peripheral display 34. The viewing position relative to peripheral camera 36 may be retrieved from information handling system 10 or may be derived by security module 142 by tracking an end user position relative to peripheral camera 36 when the end user is making inputs associated with viewing of peripheral display 34, such as inputting a password to authorize access to information handling system 10. If a second user is detected within the peripheral display viewing position, security module 142 may adjust the presentation of information at peripheral display 34, such as by dimming the display or replacing sensitive information with a security user interface. In the example embodiment, security adjustments are determined at processing resource 140, such as with artificial intelligence, and communicated to information handling system 10 for enforcement. In various embodiments, security module 142 may use infrared camera 50 and or camera module 46 to refine security adjustments based upon second end user identity and position.

Figure 14:
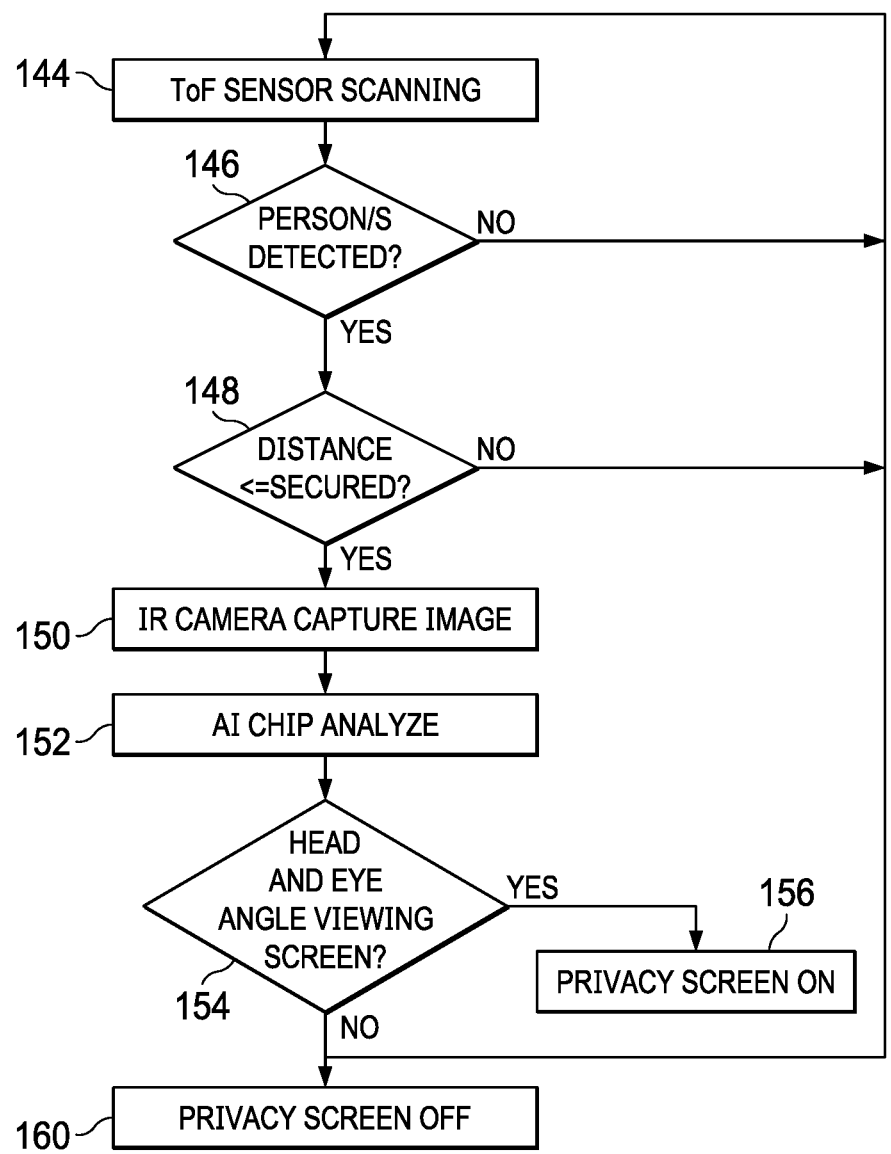
FIG. 14 depicts a flow diagram of a process for managing display privacy with a peripheral camera.

Referring now to FIG. 14, a flow diagram depicts a process for managing display privacy with a peripheral camera. At step 144 user presence is monitored with a user presence detection sensor, such as a time of flight or ultrasonic sensor. At step 146 if a person is detected the process continues to step 148 to determine if the distance to the person presents a security issue for information presented at the peripheral display. If not, the process returns to step 144. If a security issue is determined, the process continues to step 150 to capture an image of the person with an infrared camera and, optionally, a visual camera. At step 152, the processing resource analyzes the captured image, such as with artificial intelligence, to determine if a security issue exists. At step 154 the security analysis includes a head and eye angle of the second person to determine if the second person can see information on the peripheral display. If a security issue is determined, the process continues to step 156 to protect presented information with a privacy screen. If a security issue does not exist, the information continues to be presented at the peripheral display at step 160 and the process returns to step 144 to continue monitoring for security at the peripheral display.

Figure 15:
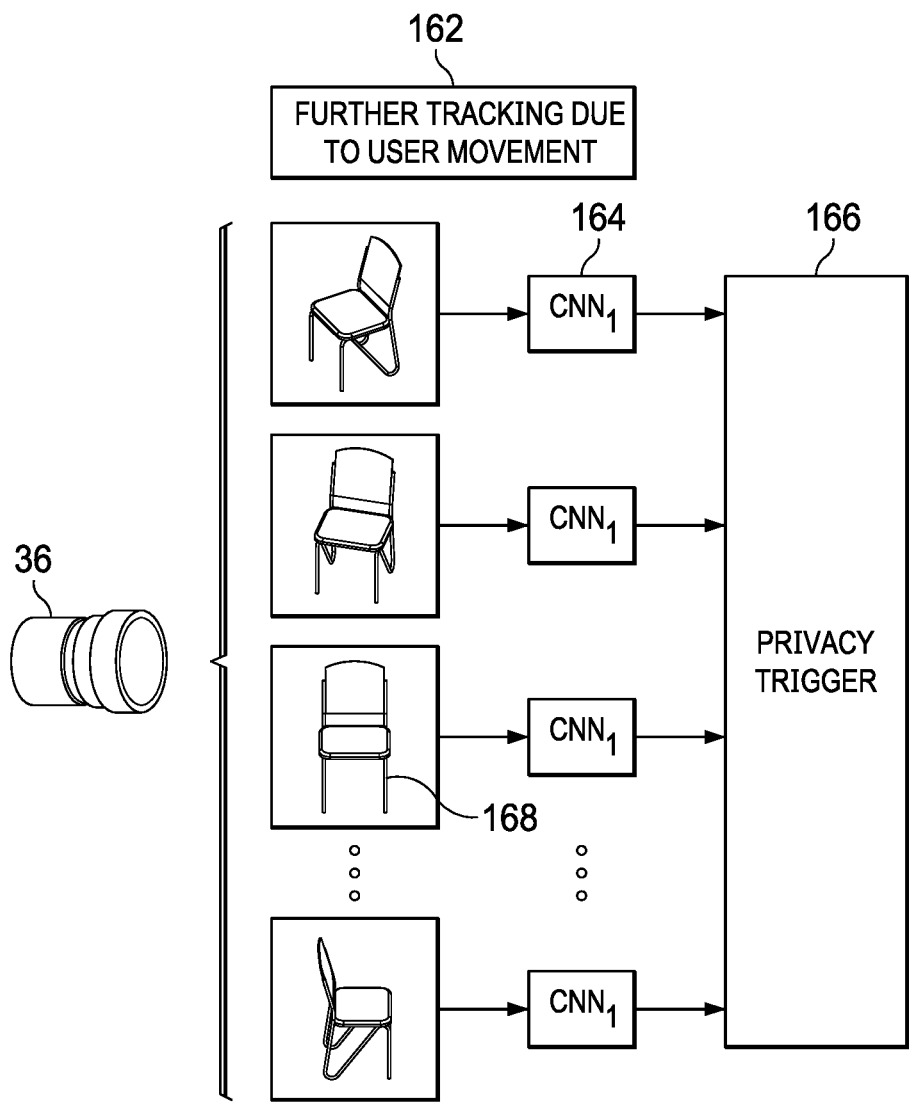
FIG. 15 depicts an example of security analysis by sensing context with a peripheral camera.

Referring now to FIG. 15, an example depicts security analysis by sensing context with a peripheral camera 36. In the example embodiment, at step 162 security tracking is initiated due to detection of user movement, such as with the user presence detection sensor. Step 164 illustrates a variety of different two dimensional images of an end user chair 168 that may be captured by peripheral camera 36 to selectively initiate a privacy trigger 166. For example, in one situation an end user might turn a chair sideways to converse with another individual where a reduced security risk might be determined since the end user will be watching the second person who is near the display. In another situation, the end user's chair position may indicate that amount of time that the end user will be gone from the viewing position. For example, artificial intelligence may model security parameters based on sensed context over time.

Figure 16:
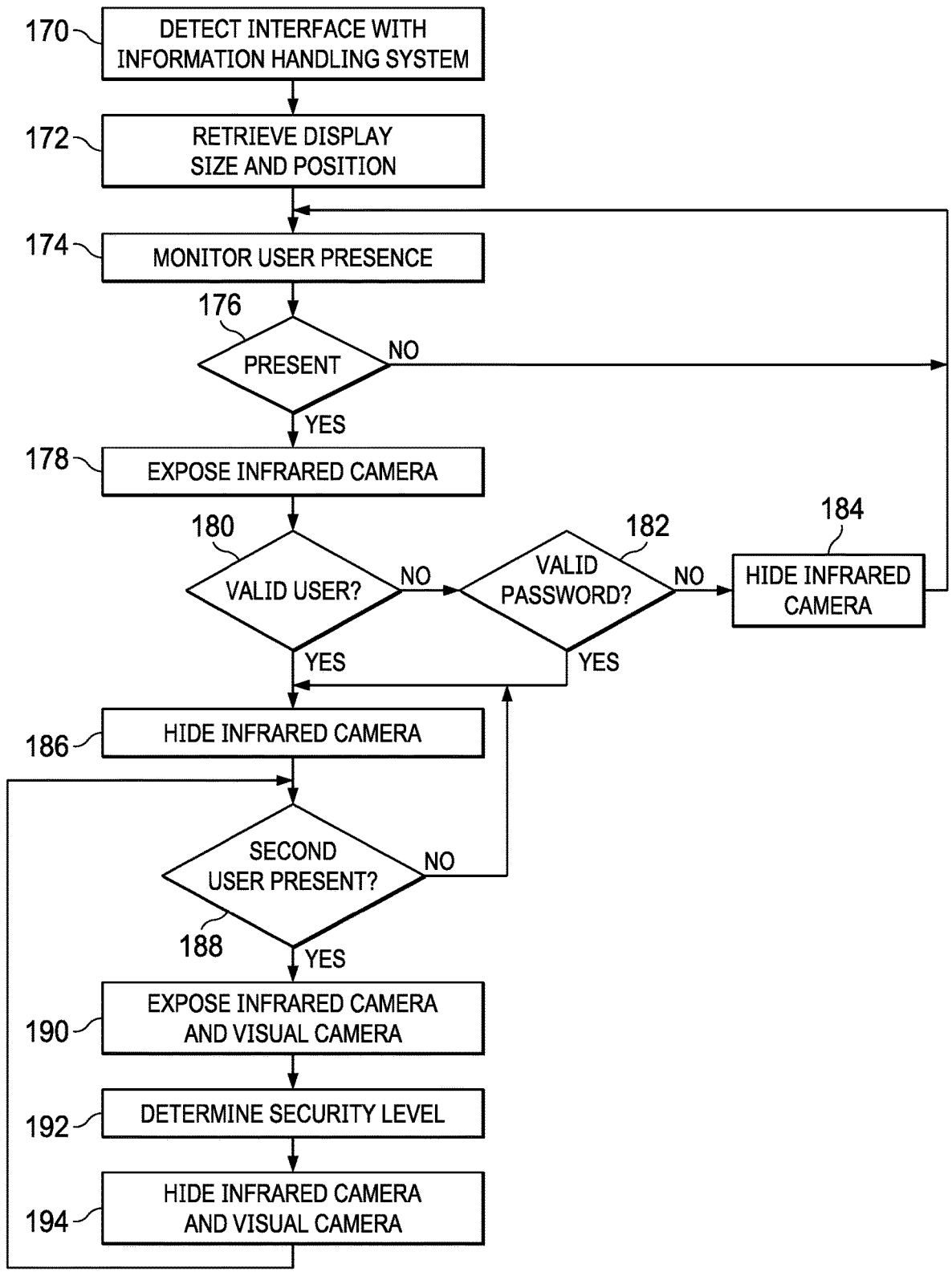
FIG. 16 depicts a flow diagram of a process for selective activation of peripheral camera functions to provide security at a peripheral display.

Referring now to FIG. 16, a flow diagram depicts a process for selective activation of peripheral camera functions to provide security at a peripheral display. The process starts at step 170 by detecting an interface by the peripheral camera with the information handling system. At step 172 the peripheral camera retrieves display size and position from the information handling system to determine security risks relative to the peripheral display viewing position. As described above, the peripheral camera position relative to the peripheral display may be derived based upon end user interactions with visual information at the display while the peripheral camera has the user in an infrared or visual field of view. At step 174, the peripheral camera initiates monitoring user presence with a user presence detection sensor. At step 176, monitoring continues until a user presence is detected, then the process continues to step 178 to expose an infrared camera. Covering the infrared camera until needed helps to maintain security by avoiding unauthorized access. At step 180 a determination is made whether the user is a valid user. If not, the information handling system may allow the user to input a valid password at step 182. If no valid password is input, the process continues to step 184 to cover the infrared camera and step 174 to monitor user presence. At step 186, after the end user is validated, the infrared camera is covered for security until separately needed. At step 188, the user presence detection sensor continues to monitor for users at the peripheral display, such as to detect a second user approaching the peripheral display. If a second user is detected, the process continues to step 190 to expose the infrared camera and, optionally, the visual camera to capture images of the second user. At step 192 a security level is determined based upon the second user position relative to the display, the size of the presented visual images and, if available, the identity of the second user. For example, the peripheral camera may command an adjustment to the presented visual images based upon the security level, such as by dimming the peripheral display or presenting a privacy screen. Once the display presentation adjustment is performed, the process continues to step 194 to cover the infrared camera for improved security and returns to step 188 to continue monitoring the second user.

Although the present invention has been described in detail, it should be understood that various changes, substitutions and alterations can be made hereto without departing from the spirit and scope of the invention as defined by the appended claims.

What is claimed is:

1. A camera comprising:
 a housing;
 a camera module disposed in the housing and operable to capture visual images in a field of view along a field of view axis;
 a cap coupled to the housing and having an opening aligned with the camera module, the cap rotating relative to the camera about the visual image field of view axis to maintain the opening aligned with visual image field of view axis during rotating and the camera module unimpeded by the cap during rotating;

a shutter plate disposed between the cap and the housing, the shutter plate having an opening aligned with the cap opening and fixed relative to the housing;

plural shutter members coupled to the cap and the shutter plate, the plural shutter members translating over the cap opening when the cap rotates a first direction and translating away from the cap opening when the cap rotates a second direction; and an actuator coupled to the cap to rotate the cap in the first and second direction based upon one or more predetermined conditions.

2. The camera of claim 1 wherein the actuator comprises gears integrated on an inner circumference of the cap, the actuator engaged with the gears to rotate the cap relative to the housing.

3. The camera of claim 2 wherein the actuator comprises a motor coupled to the housing.

4. The camera of claim 2 wherein the actuator comprises a piezoelectric device coupled to the shutter plate.

5. The camera of claim 1 further comprising a microphone coupled to the shutter plate, the cap having a microphone opening that aligns with the microphone when the plural shutter members translate away from the cap opening and misaligns when the plural shutter members translate over the cap opening.

6. The camera of claim 1 wherein the shutter plate has plural guides, each guide engaged with one of the plural shutter members to translate rotation of the cap into movement of the shutter member relative to the cap opening.

7. The camera of claim 6 further comprising a bezel coupled at a front of the cap with a fixed position relative to the housing.

8. The camera of claim 1 further comprising:
a user presence sensor coupled to the shutter plate; and
an infrared camera coupled to the shutter plate;
wherein the cap has a user presence sensor opening and an infrared camera opening, the cap aligning the user presence sensor with the user presence sensor opening and infrared camera with the infrared camera opening when the plural shutter members translate away from the cap opening, the cap misaligning the user presence sensor with the user presence sensor opening and the infrared camera with the infrared camera opening when the plural shutter members translate over the cap opening.

9. The camera of claim 1 further comprising:
a user presence sensor; and
an infrared camera;
wherein the infrared camera and the user presence sensor have an open field of view when the plural shutter members translate away from the cap opening; and
the infrared camera has a blocked field of view and the user presence sensor has an open field of view when the plural shutter members translate over the cap opening.

10. A method for covering a camera disposed in a housing, the method comprising:
coupling a cap to the housing over the camera, the cap having an opening through which the camera captures visual images;
coupling a shutter plate between the cap and the housing, the shutter plate fixed relative to the housing;
coupling plural shutter members between the cap and the shutter plate;
rotating the cap in a first direction to translate the shutter members over the cap opening; and
rotating the cap in a second direction to translate the shutter members away from the cap opening wherein rotating the cap in the first direction and the second direction is performed with the cap opening aligned with the camera to not impede capture of images by the cap.

11. The method of claim 10 further comprising:
forming gears on an inner circumference of the cap; and
engaging an actuator disposed in an interior of the housing with the gears to rotate the cap.

12. The method of claim 10 further comprising:
forming guides in the shutter plate; and
translating the shutter members over the cap opening and away from the cap opening by sliding each of the plural shutter members in the guides.

13. The method of claim 12 further comprising:
disposing an infrared camera in the housing;
aligning the infrared camera with an infrared camera opening in the cap when the shutter members translate away from the cap opening; and
blocking the infrared camera with the cap when the shutter members translate over the cap opening.

14. The method of claim 13 further comprising coupling a bezel over the cap, the bezel having a user presence detection sensor.

15. The method of claim 10 further comprising:
forming guides in the shutter plate;
rotating the cap by a predetermined amount without the shutter members translating by engagement with the shutter plate from over the cap to away from the cap;
exposing an infrared camera through an infrared camera opening of the cap when the cap rotates the predetermined amount; and
translating the shutter members away from the cap opening with further rotating of the cap past the predetermined amount.

16. The method of claim 15 further comprising detecting user presence with a user presence sensor disposed at a front side of the cap.

17. A camera comprising:
a cylinder housing having a front end;
a camera module coupled within an interior of the cylinder housing at the front end;
a cap disposed over the front end, the cap having an opening aligned with the camera module, the cap rotating relative to the cylinder housing and the camera module, the opening remaining aligned with the camera during rotating to not impede the camera;
a shutter plate coupled to the cylinder housing; and
plural shutter members rotationally coupled to the cap and engaged in guides of the shutter plate, the shutter members extending over the cap opening in response to rotation in a first direction and retracting away from the cap opening in response to rotation is a second direction.

18. The camera of claim 17 further comprising a microphone coupled to the shutter plate to align with a microphone opening when the plural shutter members retract away from the cap opening and to misalign with the microphone opening when the plural shutter members extend over the cap opening.

19. The camera of claim 18 further comprising an infrared camera coupled to the shutter plate to align with an infrared camera opening when the plural shutter members retract away from the cap opening and to misalign with the microphone opening when the plural shutter members extend over the cap opening.

20. The camera of claim 17 further comprising:
a bezel coupled over the cap; and a user presence sensor coupled to the bezel to detect user presence independent of the shutter member positions.

\* \* \* \* \*